United States Patent [19]

Matsumoto et al.

[11] Patent Number: 5,498,274
[45] Date of Patent: Mar. 12, 1996

[54] METHOD AND DEVICE FOR FORMING A GLASS PRODUCT

[75] Inventors: Itsuo Matsumoto; Yuji Furui; Yoshihiro Tsuchimoto, all of Funabashi, Japan

[73] Assignee: Asahi Glass Company, Tokyo, Japan

[21] Appl. No.: 163,758

[22] Filed: Dec. 9, 1993

[30] Foreign Application Priority Data

Dec. 14, 1992 [JP] Japan .................................. 4-353577
Aug. 13, 1993 [JP] Japan .................................. 5-222242

[51] Int. Cl.$^6$ ............................ C03B 9/193; C03B 9/30; C03B 11/00
[52] U.S. Cl. ........................ 65/80; 65/66; 65/68; 65/305; 65/308
[58] Field of Search ................................ 65/66, 68, 80, 65/305, 308

[56] References Cited

U.S. PATENT DOCUMENTS 3,951,636  4/1976  Gunthner .
5,180,412  1/1993  Tsuchimoto et al. ...................... 65/66

FOREIGN PATENT DOCUMENTS

| 1-23421 | 5/1989 | Japan . |
|---|---|---|
| 1-44648 | 9/1989 | Japan . |
| 2-271927 | 11/1990 | Japan . |
| 4-101626 | 5/1992 | Japan . |
| 4-101627 | 5/1992 | Japan . |
| 717853 | 11/1954 | United Kingdom . |
| 1440641 | 6/1976 | United Kingdom . |
| WO91/18840 | 12/1991 | WIPO . |

*Primary Examiner*—David L. Lacey
*Assistant Examiner*—Steven P. Griffin
*Attorney, Agent, or Firm*—Oblon, Spivak, McClelland, Maier & Neustadt

[57] ABSTRACT

A forming method of a glass product includes the steps of successively setting female press-molds on a gob feeding stage; feeding gob to the female press-molds at the gob feeding stage at predetermined intervals; successively transferring the female press-molds fed with the gob to a press-forming stage; press-forming the gob into a glass product at the press-forming stage; and removing the press-formed glass product at a product removing stage. A plurality of the press-forming stages are provided surrounding the gob feeding stage, and wherein a plurality of closed loop molding lines are provided each of which independently performs a series of steps including the steps of press-forming the gob and removing the press-formed glass product, along with the step of successively transferring the female press-molds fed with the gob in the step of feeding the gob to the press-forming stage in each of the closed loop molding lines, and the step of successively returning the female press-molds after finishing the step of removing the press-formed glass product to the gob feeding stage from each of the closed loop molding lines.

6 Claims, 34 Drawing Sheets

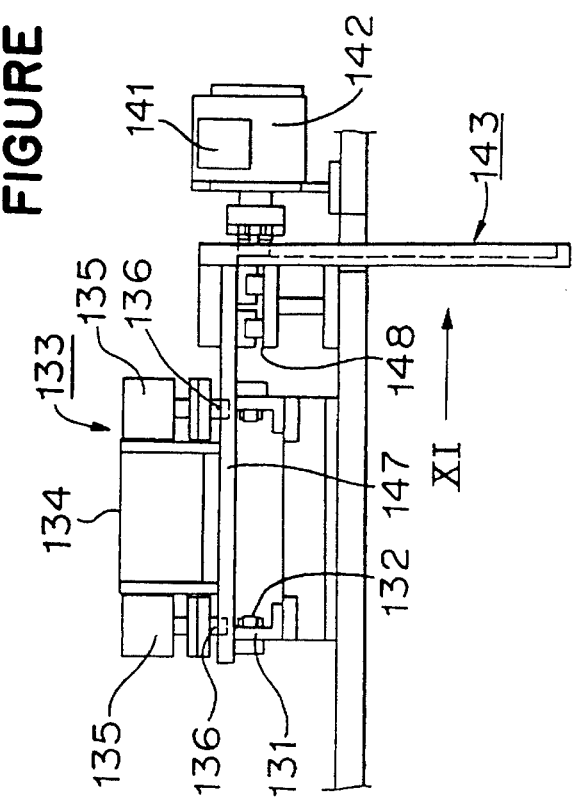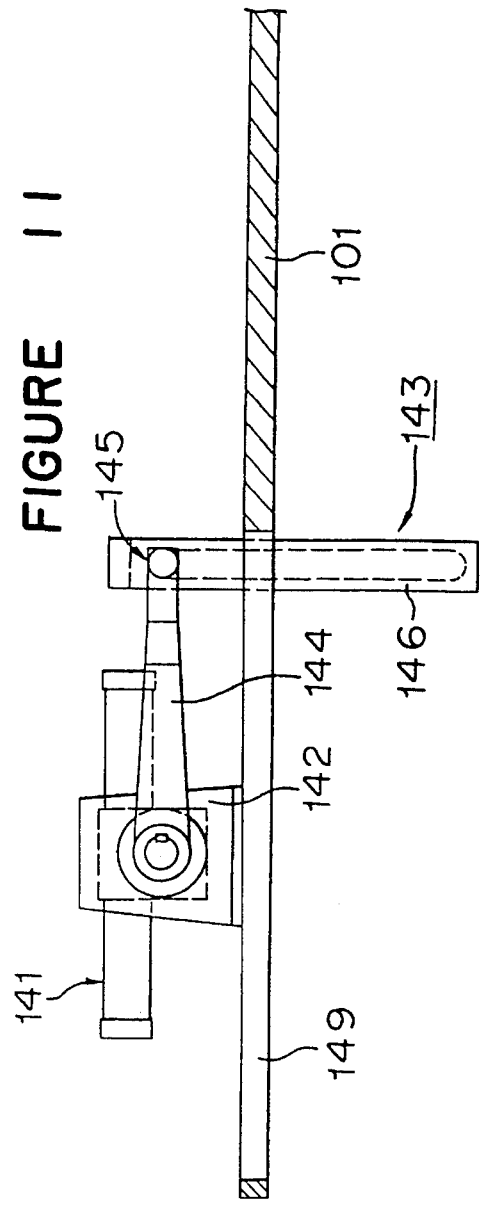

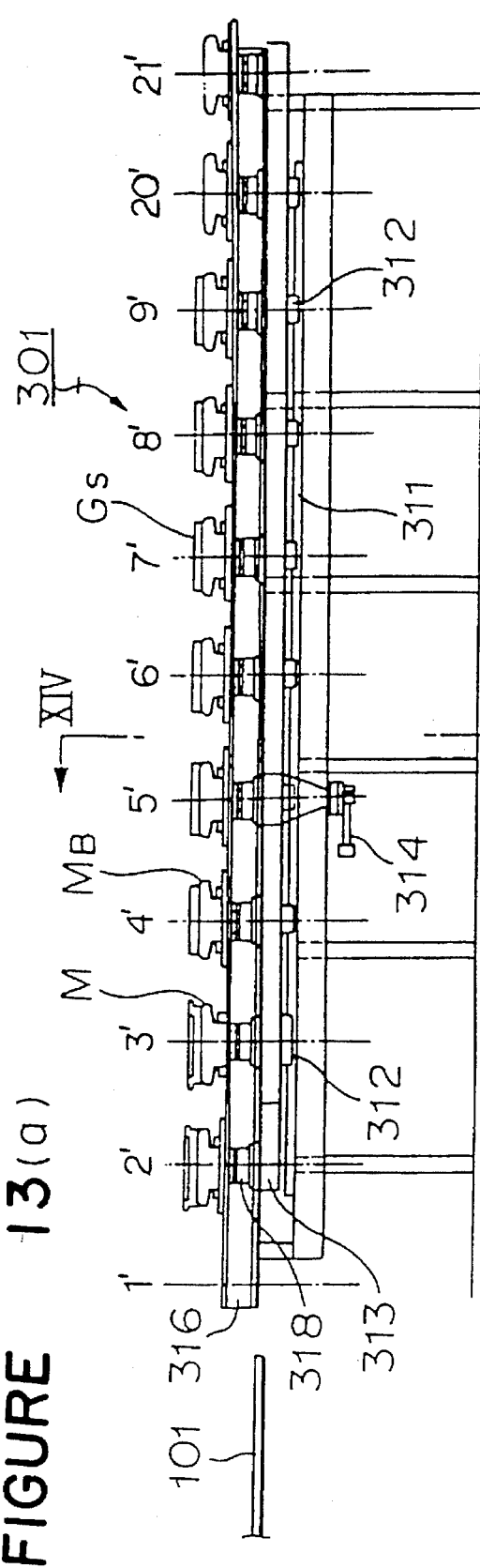
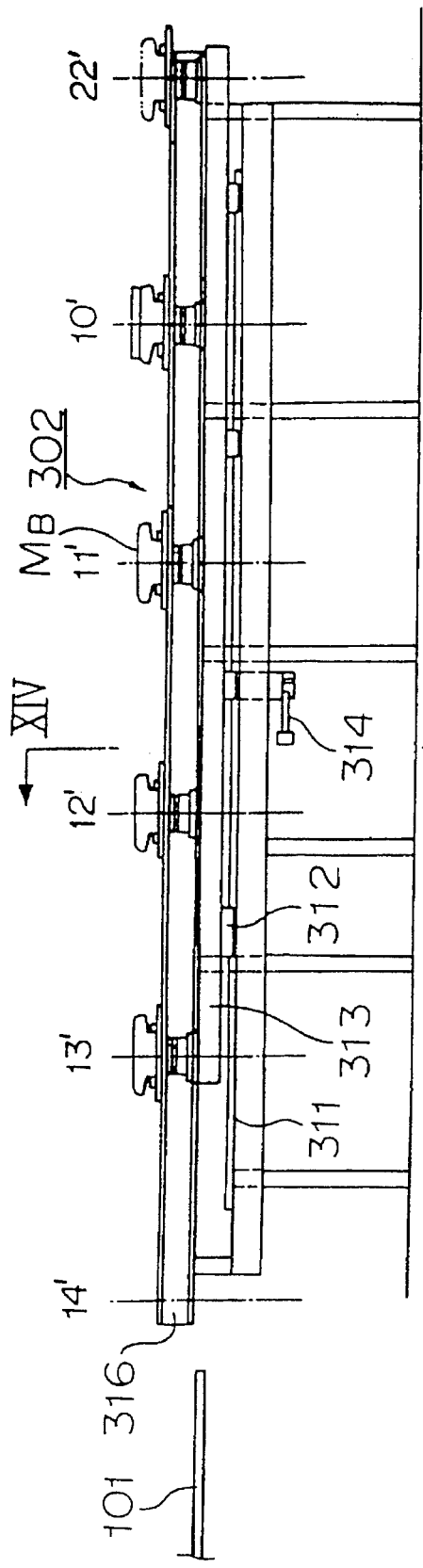
FIGURE 13(a)
FIGURE 13(b)

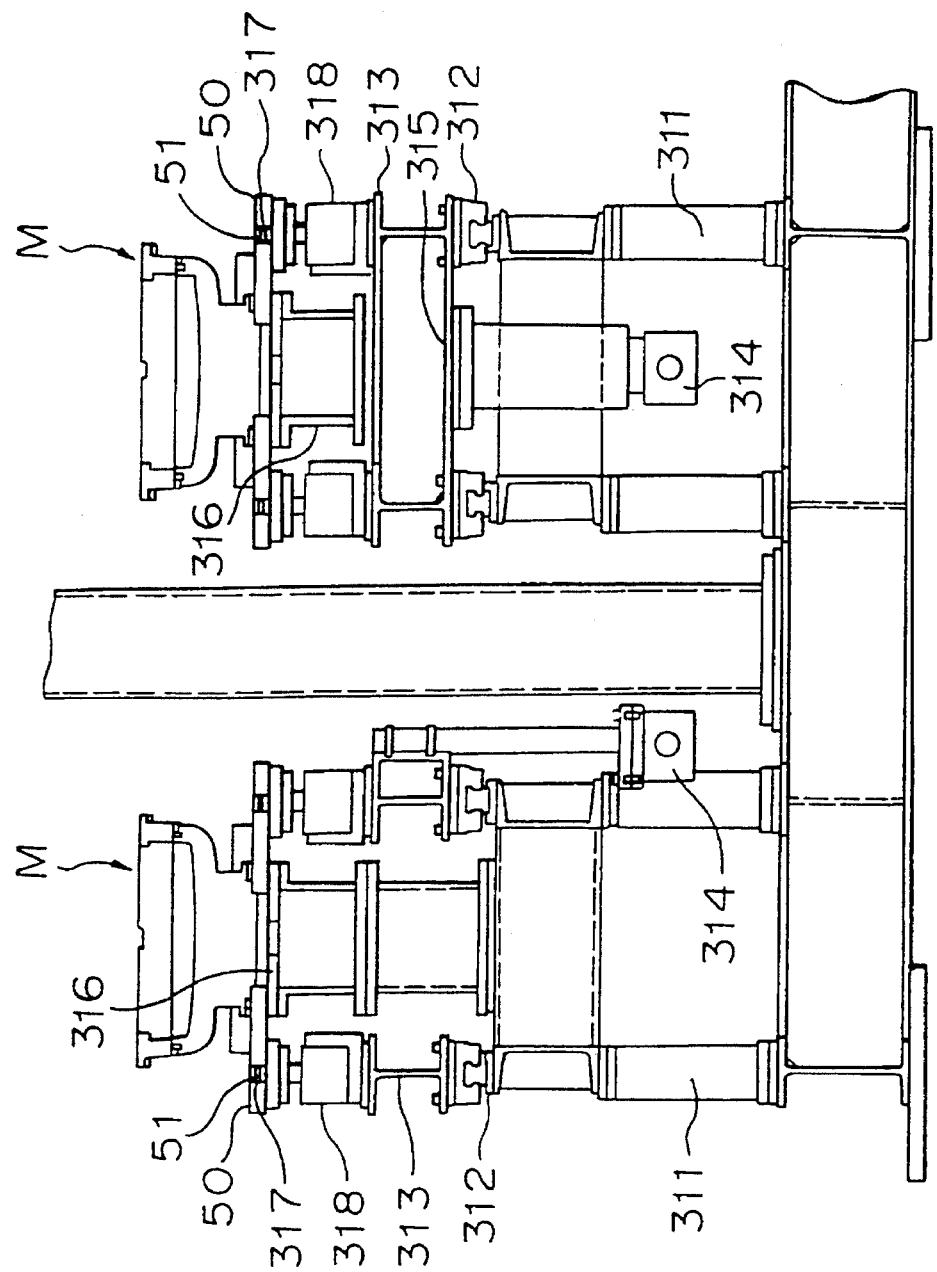

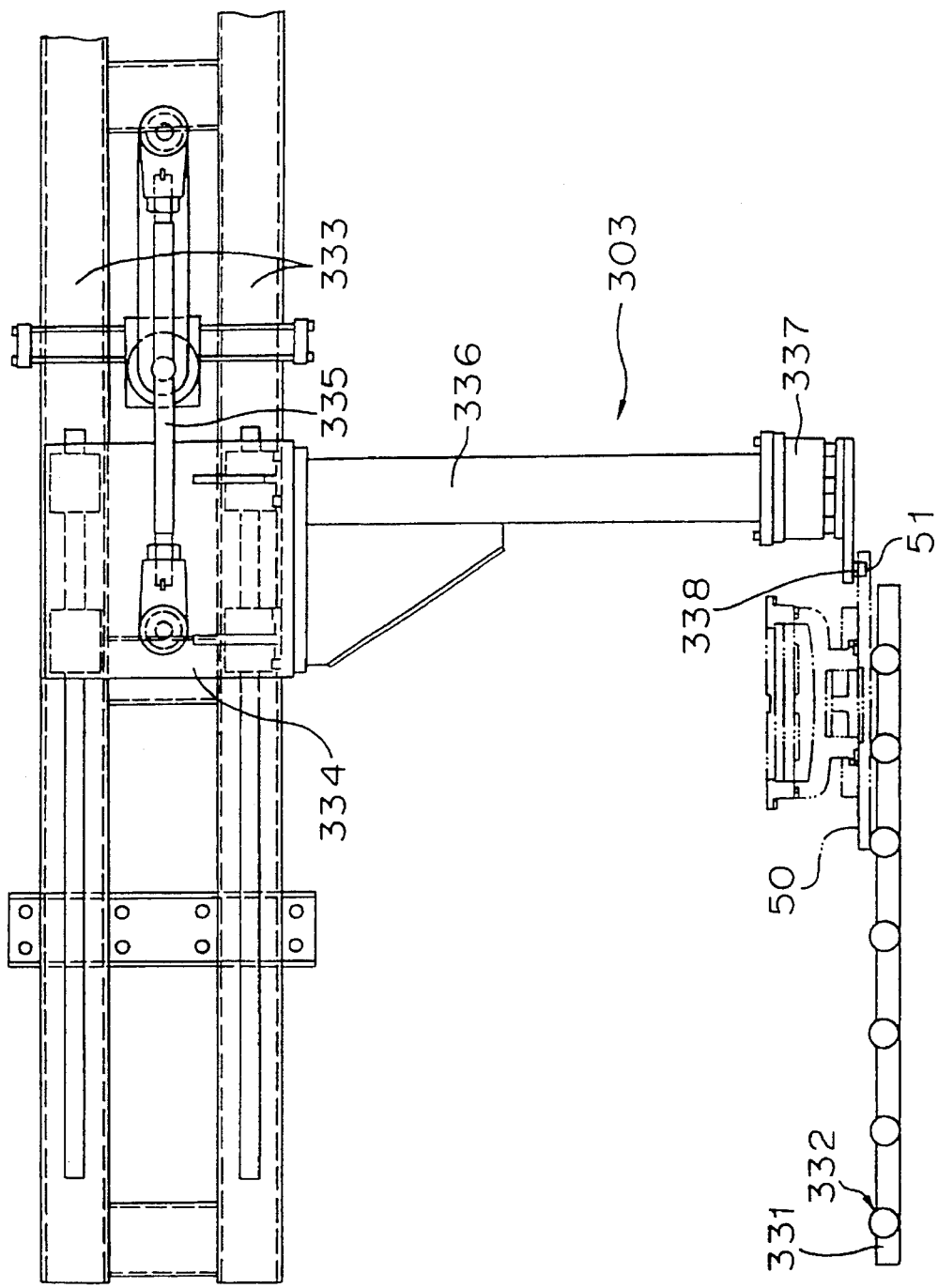

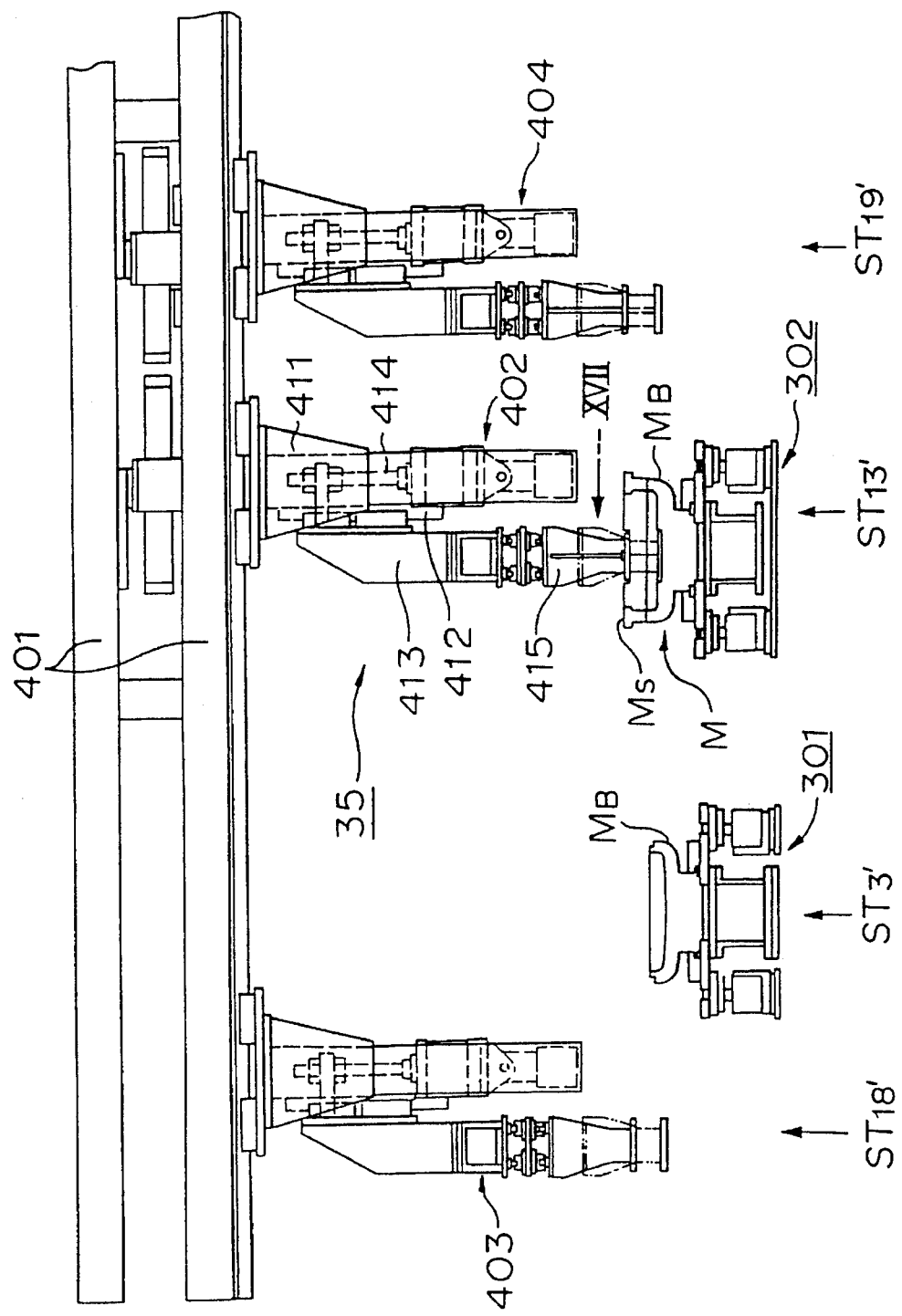

METHOD AND DEVICE FOR FORMING A GLASS PRODUCT

BACKGROUND OF THE INVENTION

1. Field of the Invention

The present invention relates to a forming method of a glass product such as a panel for a cathode ray tube (CRT) wherein a lump of glass (gob) in a molten state is dropped from an orifice (feeding port) to a female press-mold which is pressed by a male press-mold (plunger), and its device, particularly to a novel forming method of a glass product and its device with respect to a line wherein the female press-molds are successively set at a gob feeding stage, the gob is continuously fed and a glass product is successively removed after subjecting the gob to a press-forming step.

Conventionally, a method has normally been adopted in case of press-forming a glass product such as a panel for a CRT, wherein female press-molds are placed along a periphery of a rotatable disk-like table, gob is successively fed to the female press-molds placed on the table by dropping the gob from an orifice provided above the rotating table, the female press-molds are successively transfered to a press-forming stage and a glass product is press-formed by pressing the gob by a plunger.

In such a forming method of a glass product, the female press-molds are successively set at a single gob feeding stage, the gob is continuously fed, the female press-molds fed with the gob are successively transferred to the press-forming stage and the press-forming step is performed. Accordingly, the timing for feeding the gob is normally determined inevitably by a sum of a pressing time and a transfer time (index time) which is required for transferring the female press-mold from a gob feeding stage to the press-forming stage. For instance, when the pressing time is approximately 3 seconds and the index time is approximately 2 seconds, the timings of feeding the gob are at intervals of approximately 5 seconds, and therefore, the molding rate of a glass product is restricted to approximately 12 pieces per minute. Therefore, there has been a request for further promoting the molding efficiency of a glass product.

As a conventional molding method of a glass product wherein the molding efficiency of a glass product is promoted in response to the request, there is a method (Japanese Examined Patent Publication No. 23421/1989), wherein, for instance, as shown in FIG. 50, female press-molds M on a disk-like turn table T are successively set with respect to a single gob feeding stage S1 (① in FIG. 50) to which gob is continuously fed by a gob feeding device G, the female press-molds M which are set with respect to the gob feeding stage S1 are transferred by every pitch (m), and at a stage wherein the female press-molds M fed with the gob are transferred to continuous press-forming stages S21 and S22 (④ and ⑤ in FIG. 50), the press-forming step is simultaneously carried out by a press device P. Or, there is a method (see Japanese Examined Patent Publication No. 44648/1989), wherein as shown in FIG. 51, the female press-molds M on a disk-like turn table T are successively set with respect to gob feeding stages S11 and S12 (① and ② in FIG. 51), the female press-molds M which are set in the gob feeding stages S11 and S12 are transferred by every two pitches (2 m), and at the stage wherein the female press-molds M fed with the gob are transferred to two contiguous press-forming stages S21 and S22 (③ and ④ in FIG. 51), the press-forming step is simultaneously carried out by the press device P.

In the former type of device, although it is certainly possible to accelerate the timing for feeding the gob at the gob feeding stage S1, the time from when the gob touches the female press-mold M to when the pressing step is started, differs between the respective press-forming stages S21 and S22. Accordingly, the moldabilities of glass products respectively molded by the press stages S21 and S22 are different with each other, which is apt to deteriorate the uniformity of the quality of the glass product.

On the other hand, even in case of the latter type of device, although it is certainly possible to accelerate the timing for feeding the gob, by the plurality of the gob feeding stages S11 and S12, the gob which is fed to the female press-molds at the respective gob feeding stages S11 and S12 are dropped from different orifices. Accordingly, a variation is apt to cause inherently in the size of the gob, the moldabilities of the glass products respectively molded by the press-forming stages S21 and S22 differ from each other by the variation, and the uniformity of the quality of the glass product is apt to deteriorate.

Further, in both the former and the latter type of devices, heat is radiated from the female press-molds M when the gob is fed to the female press-molds M. The female press-molds M are placed in the vicinity of the outer periphery of the turn table T along its peripheral direction. Therefore, the rate of heat radiation from the female press-molds M is apt to be nonuniform in the radial direction of the turn table T. Accordingly, the thermal distortion of the female press-mold M is nonuniform in the radial direction of the turn table T, and the dimensions of the glass product are apt to be deviated in the radial direction of the turn table T.

Further, in molding a glass product, it is necessary to provide a gob feeding step, a press-forming step, a glass product removing step, a shell mold attaching step which maintains a mold forming shape by engaging a shell mold to a periphery of a bottom mold in the press-forming step, which is necessary for enabling the press-forming step by the female press-molds M, and a shell mold removing step for removing the shell mold from the bottom mold before removing the glass product which is necessary for enabling the glass product removing step. Since the female press-molds M are placed and transferred on the turn table T, the above respective steps should be laid out on a circular locus of the turn table T which is the transfer locus of the female press-molds M, the number of the female press-molds M or the bottom molds placed on the turn table T is uniquely determined by the size of the turn table T, and it is difficult to arbitrarily increase the number of the female press-molds M or the bottom molds in accordance with the necessity. Therefore, the degrees of freedom in the design of the layout of the molding line of a glass product, and in the alteration in the layout are considerably restricted.

SUMMARY OF THE INVENTION

It is an object of the present invention to solve the above technical problems and to provide a forming method of a glass product and its device capable of promoting the molding efficiency of a glass product, preferably maintaining the uniformity of the molding quality of a glass product, and considerably improving the degrees of freedom in the design of the layout and in the alteration of the layout in a molding line of a glass product.

According to an aspect of the present invention, there is provided, a forming method of a glass product comprising the steps of:

successively setting female press-molds (M) to a gob feeding stage (S1);

feeding gob (GB) to the female press-molds (M) at the gob feeding stage (S1) at predetermined intervals;

successively transferring the female press-molds (M) fed with the gob (GB) to a press-forming stage (S2);

press-forming the gob (GB) into a glass product (GS) at the press-forming stage (S2); and removing the press-formed glass product (GS) at a product removing stage (S4);

wherein a plurality of the press-forming stages (S2) are provided surrounding the gob feeding stage (S1);

wherein a plurality of closed loop molding lines (L1, L2) are provided each of which independently performs a series of steps including the steps of press-forming the gob (GB) and removing the press-formed glass product (GS), along with the step of successively transferring the female press-molds (M) fed with the gob (GB) in the step of feeding the gob (GB) to the press-forming stage (S2) in each of the closed loop molding lines (L1, L2), and the step of successively returning the female press-molds (M) after finishing the step of removing the press-formed glass product (GS) to the gob feeding stage (S1) from each of the closed loop molding lines (L1, L2); and wherein, during the step of transferring one of the female press-molds (M) fed with the gob (GB) to the press-forming stage (S2) in a first one of the closed loop molding lines (L1, L2), the step of press-forming the gob (GB) is performed in a second one of the closed loop molding lines (L1, L2).

BRIEF DESCRIPTION OF THE DRAWINGS

In the drawings:

FIG. 10 is a diagram viewed in the direction of X in FIG. 9;

FIG. 11 is a diagram viewed in the direction of XI in FIG. 10;

FIG. 13(a) is an explanatory diagram showing a front view of an outer linear transfer device with respect to processing stages of ST2 through ST9 and ST20 and ST21, and FIG. 13(b) is an explanatory diagram of a front view of an inner linear transfer device with respect to processing stages of ST10 through ST13 and ST22;

FIG. 14 is a sectional diagram taken along the line XIV—XIV in FIG. 13(a) or FIG. 13(b);

FIG. 15 is an explanatory diagram showing a cross transfer device employed in Examples;

FIG. 16 is a shell mold engaging and removing device employed in Examples;

DESCRIPTION OF THE PREFERRED EMBODIMENTS

Figure 1:
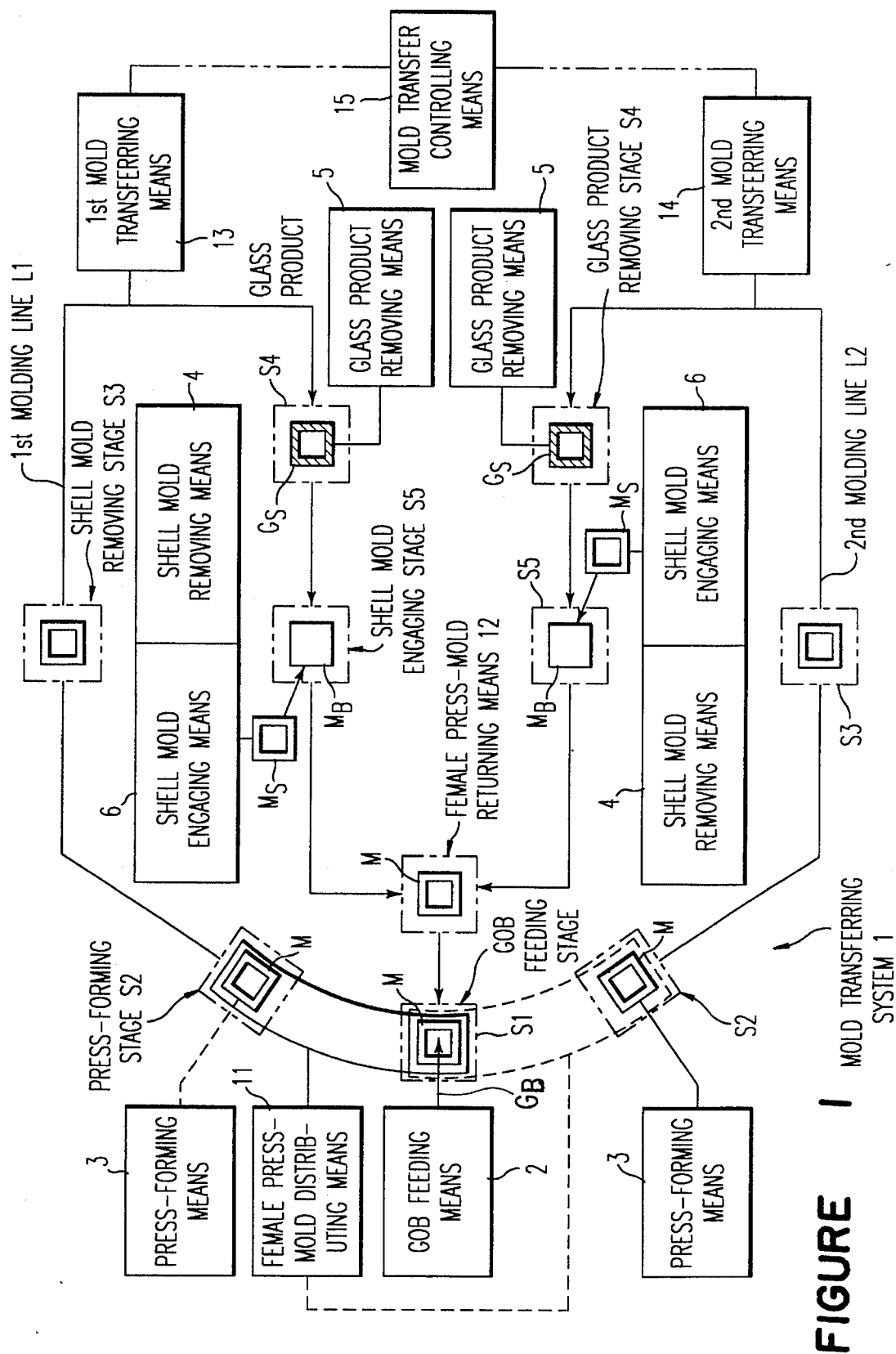
FIG. 1 is an explanatory diagram showing a forming method of a glass product and the construction of its device according to the present invention.

As a device invention for realizing the aforementioned method invention, as shown in FIG. 1, an invented forming device of a glass product includes, as a prerequisite, a mold transfering system 1 for transferring female press-molds M to respective processing stages of S1, S2 and S4, a gob feeding means 2 for successively feeding gob GB to the female press-molds M transferred to a gob feeding stage S1 at predetermined time intervals, a press-forming means 3 for press-forming the gob GB in the female press-mold M at a time point wherein the female press-mold M fed with the gob GB is transferred to a press-forming stage S2, and a glass product removing means 5 for removing a glass product GS from the female press-mold M which has been press-formed, at a glass product removing stage S4. A plurality (for instance, two) of the press-forming stages S2 are provided surrounding around the single gob feeding stage S1. The mold transfering system 1 is provided along a plurality (for instance, two sets) of closed loop molding lines L1 and L2 which include the product removing stages S4 corresponding to the respective press-forming stages S2. The mold transfering system 1 comprises a female press-mold distributing means for successively distributing the female press-molds M fed with the gob GB in the gob feeding stages S1 to a plurality of press-forming stages S2, a female press-mold returning means 12 for successively returning the female press-molds M cooperating with the female press-mold distributing means 11, from the respective closed loop molding lines L1 and L2 to the gob feeding stage S1, mold transferring means 13 and 14 for transferring the female press-molds M which are set at the press-forming stages S2 and later stages in the respective closed loop molding lines L1 and L2, and a mold transfer controlling means 15 which controls to drive the mold transferring means 13 and 14 in corporation with a step of distributing the female press-molds M by the female press-mold distributing means 11, stops, at least, the transferring the female press-mold M, in the step of distributing the female press-mold M, from the press-forming stage S2 by the mold transferring means in one of the closed loop molding lines to which the female press-mold M has been distributed in a preceding step of distributing the female press-mold M, and performing the press-forming operation by the press-forming means 3.

Further, a more specific explanation will be given of the method invention in a system wherein a type of a female press-mold M is employed in which a shell mold MS is engaged with and removed from a periphery of a bottom mold MB, and is provided with two sets of closed loop molding lines L1 and L2. As shown in FIG. 1, this method invention includes, as a prerequisite, a gob feeding step of feeding the gob GB at predetermined time intervals, after successively setting the female press-molds M each consisting of the bottom mold MB and the shell mold MS that is engaged with a periphery of the bottom mode MB, a press-forming step of press-forming the gob GB after successively transferring the female press-molds M fed with the gob GB to the press-forming stage S2, a shell mold removing step for removing the shell mold MS from the female press-mold M at a shell mold removing stage S3 after finishing the press-forming step, a glass product removing step for removing the glass product GS from the bottom mold MB finished with the shell mold removing step, at the glass product removing stage S4, and a shell mold engaging step of engaging the shell mold MS to the bottom mold MB finished with the glass product removing step, at a shell mold engaging stage S5, before the female press-mold M is set at the gob feeding stage S1. A pair of the press-forming stages S2 are provided interposing the single gob feeding stage S1. Two sets of the closed loop molding lines L1 and L2 are provided wherein a series of steps comprising the press-forming step, the shell mold removing step, the glass product removing step and the shell mold engaging step, are independently performed. The female press-molds M fed with the gob in the gob feeding step, are alternately transferred to the press-forming stages S2 in the respective closed loop molding lines L1 and L2. The female press-molds M finished with the shell mold engaging step, are returned to the gob feeding stage S1 alternately from the respectively closed loop molding lines L1 and L2. In the step of transferring the female press-mold M which has been fed with the gob to the press-forming stage S2 at the closed loop molding line L1, the press-forming step at the closed loop molding line L2, is performed.

Further, as another device invention for realizing such a method invention, as shown in FIG. 1, a forming device of a glass product includes, as a prerequisite, a mold transferring system 1 for transferring, step by step, the female press-molds M each consisting of the bottom mold MB and the shell mold MS that is engaged with a periphery of the bottom mode MB or the bottom mode MB to the respective processing stages S1 through S5, the gob feeding means 2 for successively feeding the gob GB to the female press-molds transferred to the gob feeding stage S1, at predetermined time intervals, the press-forming means 3 for press-forming the gob GB in the female press-mold M at a time point wherein the female press-mold M fed with the gob GB is transferred to the press-forming stage S2, a shell mold removing means 4 for removing the shell mold MS from the female press-mold M at the shell mold removing stage S3 after the gob has been press-formed, the glass product removing means 5 for removing the glass product GS from the bottom mold MB that is removed of the shell mold MS, at the glass product removing stage S4, and a shell mold engaging means 6 for engaging the shell mold MS to the bottom mold MB that is removed of the glass product GS, at the shell mold engaging stage S5, before setting the female press-mold to the gob feeding stage S1. The mold transferring system 1 is provided along two sets of the closed loop molding lines L1 and L2 each of which is provided with the shell mold removing stage S3, the glass product removing stage S4 and the shell mold engaging stage S5, corresponding to the respective press-forming stage S2. The mold transferring system 1 comprises the female press-mold distributing means 11 for distributing the female press-molds M alternately to a pair of the press-forming stages S2 at the gob feeding stage S1, the female press-mold returning means 12 for returning the female press-molds M each consisting of the bottom mold MB and the shell mold MS that has been engaged with the bottom mold MB at the shell mold engaging stage, to the gob feeding stage S1 alternately from the respective closed loop molding lines L1 and L2, in cooperation with the female press-mold distributing means 11, the first mold transferring means 13 for transferring the female press-molds M or the bottom molds MB which are set in the press-forming stage S2 and later stages in the closed loop forming line L1, the second mold transferring means 14 for transferring the female press-molds M or the bottom molds MB which are set in the press-forming stage S2 and later stages in the other closed loop molding line L2, the mold transfer controlling means 15 whereby the first and the second mold transferring means 13 and 14 are controlled to drive in cooperation with the step of distributing the female press-molds M by the female press-mold distribution means, stops, at least, the transferring of the female press-mold M from the press-forming stage S2 by the first mold transferring means 13 or the second mold transferring means 14 of the closed loop molding lines L1 and L2 on the side to which the female press-mold M has not been distributed in the distributing step, is stopped, and the press-forming by the press-forming means 3 is performed.

In such a technical means, the gob feeding means 2 may pertinently be selected, so far as the gob feeding means 2 can feed the gob of a predetermined size to the gob feeding stage S1 by a predetermined posture at predetermined timings. Further, the design of the press-forming means 3 may pertinently be altered, so far as the press-forming means 3 stops the female press-mold M at the press-forming stage S1 and press-forms the gob in the female press-mold M by a male press-mold. Further, the design of the glass product removing means 5 may pertinently be altered, so far as the glass product removing means 5 removes the glass product GS without impairing it, which is, for instance, a means for vacuum-transferring the glass product GS, and the like. Further, the designs of the shell mold removing means 4 and the shell mold engaging means 6 may pertinently be altered, so far as they can achieve their functions individually. However, in view of achieving the simplification of the device, it is preferable to design a means which is provided with the functions of both the shell mold removing means 4 and the shell mold engaging means 6. Further, it is preferable to provide a stage of exchanging the shell mold MS and the bottom mold MB, in consideration of the durability the female press-mold.

The glass product GS in this invention includes a glass product which is manufactured by the press-forming operation, such as a panel or a funnel for a CRT, a glass table wear such as a dish and a cup, a glass vase, various glass bottles, or glass block. The invented method and device are widely applicable in press-forming the various kinds of glass products.

Further, the closed loop molding lines L1 and L2 can adopt various shapes such as a ring shape, a rectangular shape, a shape having linear portions and curved portions, and the closed loop molding line can be flexibly constructed in accordance with the shape of a space in a facility.

Further, as the female press-mold distributing means 11 composing the mold transferring system 1, a transfer member for transferring the female press-mold M may move along a linear locus or a swirl locus, so far as the transfer member successively distributes and transfers the female press-mold M which has been set at the gob feeding stage S1 to a plurality of press-forming stages S2. Especially, as the type of the transfer member which alternately distributes and transfers the female press-mold M to the pair of the press-forming stage S2, it is preferable to adopt a system employing a swirl transfer member, in view of minimizing a time loss for joining the female press-molds M towards the single gob feeding means 2 from two of the female press-mold returning means 12.

It is necessary that the transfer member is provided with a means for accurately positioning the female press-mold M at the gob feeding stage S1 and a means for delivering the female press-mold M to the side of the press-forming means 3 at the press-forming stage S2.

Further, in the female press-mold distributing means 11 for distributing the female press-molds M to the pair of the press-forming stages S2, the female press-molds M are distributed basically by employing a single reciprocatable transfer member. However, for instance, since it is necessary to operate only one of the closed loop molding lines L2 and L1, in exchanging a male press-mold of the press-forming means 3 in the other one of the closed loop molding lines L1 and L2, in view of satisfying the request, it is preferable to design the female press-mold distributing means which employs a pair of the transfer members each of which independently distributes the female press-molds M to each of the closed loop molding lines L1 and L2.

Further, the female press-mold returning means 12 returns the female press-molds M in cooperation with the distributing operation of the female press-molds M by the female press-mold distributing means 11. A new female press-mold M is returned to the gob feeding stage S1 from one of the closed loop molding lines L1 and L2, during or after the distributing operation of the female press-molds M by the female press-mold distributing means 11.

In this case, in view of promoting the processing efficiency of the female press-mold returning means 12, it is preferable to design the female press-mold returning means 12 such that two of the female press-mold returning means 12 are provided to the respective closed loop molding lines L1 and L2 to minimize a time loss in joining the female press-molds, or such that the female press-mold M from one closed loop molding line is returned to the gob feeding stage S1 during the distributing operation of the female press-mold M to the press-forming stage S2 in the other closed loop molding line. As a specific embodiment of the latter design, a pushing guide mechanism as the female press-mold returning means 12 is installed on a transfer member as the female press-mold distributing means 11, whereby, when the transfer member returns to an initial position of the gob feeding stage S1 from one closed loop molding line, the female press-mold M received from the other closed loop molding line is returned to the gob feeding stage S1.

Further, as the mold transferring means 13 and 14, a walking beam system wherein the transferring of molds is performed by a walking motion employing a travelling beam (whether it is linear or swirling) and vertically travelling lifters, a chain conveyor with attachments, a belt conveyor or the like may pertinently be selected, so far as the mold transferring means can transfer the female press-molds M or the bottom molds MB pitch by pitch.

In this case, it is possible to arbitrarily construct transfer routes of the respective mold transferring means 13 and 14 by pertinently combining curved routes and linear routes, and it is preferable to provide stages for exchanging the bottom molds MB and the like in the transfer routes in accordance with the necessity.

Further, the mold transfer controlling means 15, at least, stops the transferring of the female press-mold M from the press-forming stage S2, in the step of distributing the female press-mold M by the female press-mold distributing means 11, by the mold transferring means of the closed loop molding line to which the female press-mold M has been distributed in a preceding distributing step, and performs the press-forming operation by the press-forming means 3.

In this case, the mold transfer controlling means 15 controls to drive the mold transferring means 13 and 14 in corporation with the step of distributing the female press-molds M by the female press-mold distributing means 11. As an embodiment of the driving control, all the mold transferring means 13 of the closed loop molding line to which the female press-mold M has been distributed, for instance, L1, may be moved pitch, and the transfer operation of the mold transferring means 14 of the other closed loop molding line, for instance, L2, may be stopped. Or, the respective mold transferring means 13 and 14 may partially be moved pitch by pitch in corporation with the step of distributing the female press-molds, and the respective mold transferring means 13 and 14 may be temporarily stopped with respect to portions wherein the processings at the processing stages are necessary.

The applicants have already proposed prior arts wherein a glass product such as a panel for a CRT is manufactured by linearly transferring female press-molds between independent steps.

A prior art 1 (Japanese Unexamined Patent Publication No. 271927/1990), discloses that two press-forming devices are provided interposing one gob feeding device. However, a method and its specific means for distributing female press-molds from one gob feeding device to two press-forming devices, are not sufficiently disclosed. The present invention improves the prior art 1 and the productivity is further promoted.

Further, another prior art 2 (Japanese Patent Application No. 101626/1992) and another prior art 3 (Japanese Patent Application No. 101627/1992) proposed other examples wherein the invention of the prior art 1 is improved and the productivity is promoted. These are an example wherein gob is fed from two or more gob feeding devices to a plurality of female press-molds wherein approximately simultaneous press-forming is performed after approximately simultaneously feeding gob to the plurality of female press-molds, and an example wherein the gob is successively fed from one gob feeding device to a plurality of female press-molds and the press-forming is performed approximately simultaneously. These prior arts 2 and 3 are not provided with a mechanism for distributing the female press-molds from the gob feeding device or devices to the press-forming devices, and the plurality of female press-molds in a group are transferred from the gob feeding device or devices to the press-forming devices, which are clearly differentiated from the present invention.

According to an aspect of the present invention, there is provided a forming method of a glass product comprising the steps of:

successively setting female press-molds to a gob feeding stage;

feeding gob (GB) to the female press-molds (M) at the gob feeding stage at predetermined intervals;

successively transferring the female press-molds (M) fed with the gob to a press-forming stage;

press-forming the gob into a glass product at the press-forming stage; and removing the press-formed glass product at a glass product removing stage;

wherein a pair of the press-forming stages are provided surrounding the gob feeding stage;

wherein a pair of closed loop molding lines are provided each of which independently performs a series of steps including the steps of press-forming the gob and removing the press-formed glass product;

wherein a female press-mold returning means is provided for alternately returning empty female press-molds finished with the step of removing the press-formed glass product to the gob feeding stage from the pair of the closed loop molding lines;

wherein a dummy transferring step is provided between the step of transferring the female press-mold fed with the gob to the press-forming stage of a first one of the closed loop molding lines and the step of transferring the female press-mold fed with the gob to the press-forming stage of a second one of the closed loop molding lines; and wherein in said dummy transferring step, the female press-mold transferring means is reciprocated by n (which is an integer not less than 1) times without transferring the empty female press-molds, the step of press-forming is performed and the female press-molds whose number is smaller than a total number of processing stages of the press-forming stage and later stages by at least two are selectively transferred;

said female press-mold distributing means forming a single cycle by a number of the steps of reciprocating the female press-mold distributing means, said number being an odd number not less than three.

Further, according to another aspect of the present invention for realizing the above aspect, there is provided a forming device of a glass product comprising:

a gob feeding means for successively feeding gob to female press-molds transferred to a single gob feeding stage at predetermined intervals;

a press-forming means for press-forming the gob in the female press-molds into a glass product when the female press-molds fed with the gob are transferred to a press-forming stage; and a glass product removing means for removing the glass product at a glass product removing stage;

wherein the press-forming stage is provided to surround the single gob feeding stage;

wherein a pair of closed loop molding lines each independently performing a series of steps including a step of the press-forming and a step of removing the glass product, and a female press-mold distributing means for transferring the female press-molds which are empty after finishing the glass product removing step from the pair of the closed loop molding lines alternately to the press-forming stages and alternately distributing the female press-molds to the press-forming means, are provided; and wherein a control device for selectively transferring the female press-molds whose number is smaller than a total number of processing stages of the press-forming stage and later stages at least by two or more.

This forming method and forming device further enhance the degrees of freedom in the forming device and the forming method of the aforementioned present invention, which is, for instance, suitable for manufacturing a large-size glass product.

In the forming device and the forming method of a glass product of the aforementioned present invention, a time interval from the moment of dropping the gob to the female press-mold to when the press-formed glass product is removed, is inevitably determined by the interval for feeding the gob and the number of the processing stages from the gob feeding stage to the glass product removing stage.

The interval for feeding the gob is equal to a sum of a time for processing in each of the processing stages and a time required for transferring the female press-mold or the bottom mold by one stage. Considering this, for instance, in a forming device of a glass product, wherein the gob is fed to the mold approximately 1 second before starting the transfer, the product is removed from the bottom mold approximately 2 seconds after completing the transfer, the respective processing stages are arranged in a line form, the time is shortened by a half phase both in a cross transfer stage and the gob feeding stage, and the number of the processing stages from the gob feeding stage to the glass product removing stage is 13, in case wherein the interval for feeding the gob is 6 seconds and the time required for the index is 1 second, the time interval from the gob-feeding to the glass-product removing is approximately 67 seconds.

The time interval from the gob-feeding to the glass-product removing is approximately 67 seconds and remains constant when the interval of feeding the gob is 6 seconds and does not depend on the weight of the gob. However, assuming a case of forming a glass product wherein the gob weight is twice as much as that in the former example, it is necessary to feed glass matrix from a melting furnace of glass by an amount which is twice as much as that in the former example. The variation in the feeding amount of the glass matrix deteriorates the quality of the glass per se (segregation of bubbles or foreign components contained in glass, etc.).

When the feeding amount of the glass matrix from the melting furnace in case of molding a glass product having the gob weight twice as much as that in the former example, the interval of feeding gob is doubled to 12 seconds and the time from the gob-feeding to the glass product-removing is approximately 130 seconds. Therefore, the temperature of the glass product at the glass product removing stage is too low which is apt to cause cracks.

Similarly, a time required for circulating the shell mold on the device is also prolonged, and a leaving heat quantity of the shell mold by the natural radiation is larger than a receiving heat quantity thereof. Therefore, the temperature of the shell mold undergoes a change at a lower level. Accordingly, cracks are apt to cause on the contact face between the glass at a high temperature and the shell mold at a low temperature.

To solve the above technical problem, the capacity of the melting furnace of glass is increased (normally the capacity is determined by the size of the melting furnace), or the layout of the forming device of a glass product is changed, and the number of the processing stages from the gob-feeding to the glass product removing is reduced, thereby controlling the time interval from the gob-feeding to the glass product removing to a suitable value. However, all the above methods require a large-scaled change of layer, which is not easy.

It is another object of the present invention to further provide a forming method of a glass product and its device capable of molding a glass product in a preferable temperature condition by employing molds of a necessary number without newly designing the layout of the forming device and changing the layout, while maintaining the quality of the glass matrix in an excellent state by maintaining constant the feeding amount of the glass matrix from the melting furnace of glass.

In the following method according to the present invention, a predetermined number of stages are not operated by employing female press-molds M, the number of which is smaller than a total number of processing stages of each of the closed loop molding lines L1 and L2 by a predetermined number, and only predetermined female press-molds are transferred by one step in use of the nonoperation of stages. Further, one cycle of the mold transfer is performed by reciprocating steps of the female press-mold distributing means 11 (FIG. 1), the number of the reciprocating steps which is an odd number not less than 3, whereby all the female press-molds undergo the same thermal cycle. The "one cycle" does not indicate the female press-mold is circulated over the whole stages, but that the arrangement of the female press-molds and the state of the female press-mold distributing means 11 restore to the same arrangement and the same state.

Further, a function is added to the forming device of a glass product realizing the forming method wherein only predetermined female press-molds can selectively be transferred at the respective mold transferring steps, by providing the mold-transfer controlling means 15 whereby the mold transferring means 13 and 14 are controlled to drive in corporation with the step of distributing the female press-molds M by the female press-mold distributing means 11, the transferring of the female press-mold M from the press-forming stage S2, at least in the step of distributing the female press-molds M, by the mold transferring means of the closed loop molding line to which the female press-mold M has been distributed in the preceding distributing step, is stopped, and the press-forming is performed by the press-forming means 3.

First, an explanation will be given of the basic operation of a forming device of a glass product according to the present invention.

In FIG. 1, in the mold transferring system 1, a plurality, for instance, a pair of the press-forming stages S2 are provided surrounding around the single gob feeding stage S1, along a plurality, for instance, a pair of the closed loop molding lines L1 and L2, which include the glass product removing stages S4 corresponding to the respective press-forming stages S2.

The female press-mold distributing means 11 successively distributes the female press-molds M fed with the gob GB in the gob feeding stage S1 to the plurality of press-forming stages S2, and the female press-mold returning means 12 successively returns the female press-molds M to the gob feeding stage S1 from the respective closed loop molding line L1 and L2, in cooperation with the female press-mold distributing means 11.

Further, the mold transfer controlling means 15 controls to drive the mold transferring means 13 and 14 in cooperation with the step of distributing the female press-molds M by the female press-mold distributing means 11, stops the transferring of the female press-mold M from the press-forming stage S2, at least in the above distributing step, by the mold transferring means of the closed loop molding line to which the female press-mold M has been distributed at the preceding distributing step, and has the press-forming means 3 perform the press-forming operation.

Next, an explanation will be given of the operation of a forming device of a glass product of this invention, which is a type of device wherein the female press-mold M consists of the bottom mold MB and the shell mold MS that is engaged with and removed from the periphery of the bottom mold MB, and which is applicable to the system having a pair of the closed loop molding lines L1 and L2.

The mold transferring system 1 is provided with a pair of press-forming stages S2 interposing the single gob feeding stage S1, and is provided along a pair of the closed loop molding lines L1 and L2 in each of which the shell mold removing stage S3, the glass product removing stage S4 and the shell mold engaging stage S5 are provided in correspondence with the press-forming stage S2. As shown in FIG. 1, the respective means 11 through 15 composing the mold transferring system 1 operate as follows.

The female press-mold distributing means 11 alternately distributes the female press-molds M fed with the gob in the gob feeding stage S1 to the pair of the press-forming stages S2. Further, the female press-mold returning means 12 alternately returns the female press-molds M each of which consisting of the bottom mold MB and the shell mold MS that has been engaged with the periphery of the bottom mold MB in the shell mold engaging stage S5, to the gob feeding stage S1 from the respective closed loop molding lines L1 and L2.

Further, the first mold transferring means 13 transfers the female press-molds M or the bottom molds MB which are set in the press-forming stage S2 and later stages in the closed loop molding line L1, and the second mold transferring means 14 transfers the female press-molds M or the bottom molds MB which are set in the press-forming stage S2 and later stages in the closed loop molding line L2. These mold transferring means 13 and 14 are pertinently controlled to drive by the mold transfer controlling means 15.

Specifically, the mold transfer controlling means 15 controls to drive the first and the second transferring means 13 and 14 in cooperation with the step of distributing of the female press-molds M by the female press-mold distributing means 11, wherein the transferring of the female press-mold M from the press-forming stage S2 of the first mold transferring means 13 or the second mold transferring means 14 of one of the closed loop molding lines L1 and L2 to which the female press-mold M has not been distributed, at least at the step of distributing the female press-mold M by the female press-mold distributing means 11, is stopped and has the press-forming means 3 perform the press-forming operation.

Accordingly, in the step wherein the female press-mold distributing means 11 distributes the female press-mold M from the gob feeding stage S1 to the press-forming stage S2 on the side of the closed loop molding line (for instance, L1), the second mold transferring means 14 of the other closed loop molding line (for instance, L2) stops the transferring of the female press-mold M from the press-forming stage S2, and the press-forming operation by the press-forming means 3 is simultaneously performed. Accordingly, the timing of feeding the gob at the gob feeding stage S1 can substantially be determined by considering only the press-forming time at the press-forming stage S2, without considering the index time of the female press-mold M to the press-forming stage S2.

For instance, in case wherein the press-forming time is approximately 3 seconds and the index time is approximately 2 seconds, the molding efficiency of 60/3=20 per minute in the present invention is provided, in contrast to the molding efficiency of the conventional technology of {60/(3+2)}=12/minute.

Further, it is also possible that the mold transfer controlling means 15 controls to drive the first and second mold transferring means 13 and 14 in cooperation with the step of distributing the female press-molds M by the female press-mold distributing means 11, whereby only portions of the female press-molds M or the bottom molds MB which are selected by the mold transfer controlling means 15, are transferred in the respective transfer steps, and the one cycle is composed by the reciprocating steps of the female press-mold distributing means 11, the number of which is an odd number not less than 3.

For instance, in case of controlling to perform one cycle by 3 times of the reciprocating steps in one closed loop molding line, the stop time at the processing stages can be selected stepwisely by 1 through 3 reciprocating steps. Further, the range of selection in the number of use of the bottom molds MB and the shell molds MS is widened by changing the number of nonoperated processing stages provided in the closed loop molding line. Further, in molding glass products having a wide range of the gob weight, the time for circulating the bottom mold MB throughout the respective processing stages in an optimum state with respect to the thermal cycle, can be provided by pertinently setting the number of use of the bottom molds MB while maintaining constant the feeding amount of the glass matrix from the melting furnace.

EXAMPLE 1

A detailed explanation will be given of this invention based on examples shown by the attached drawings as follows.

Total system

Figure 2:
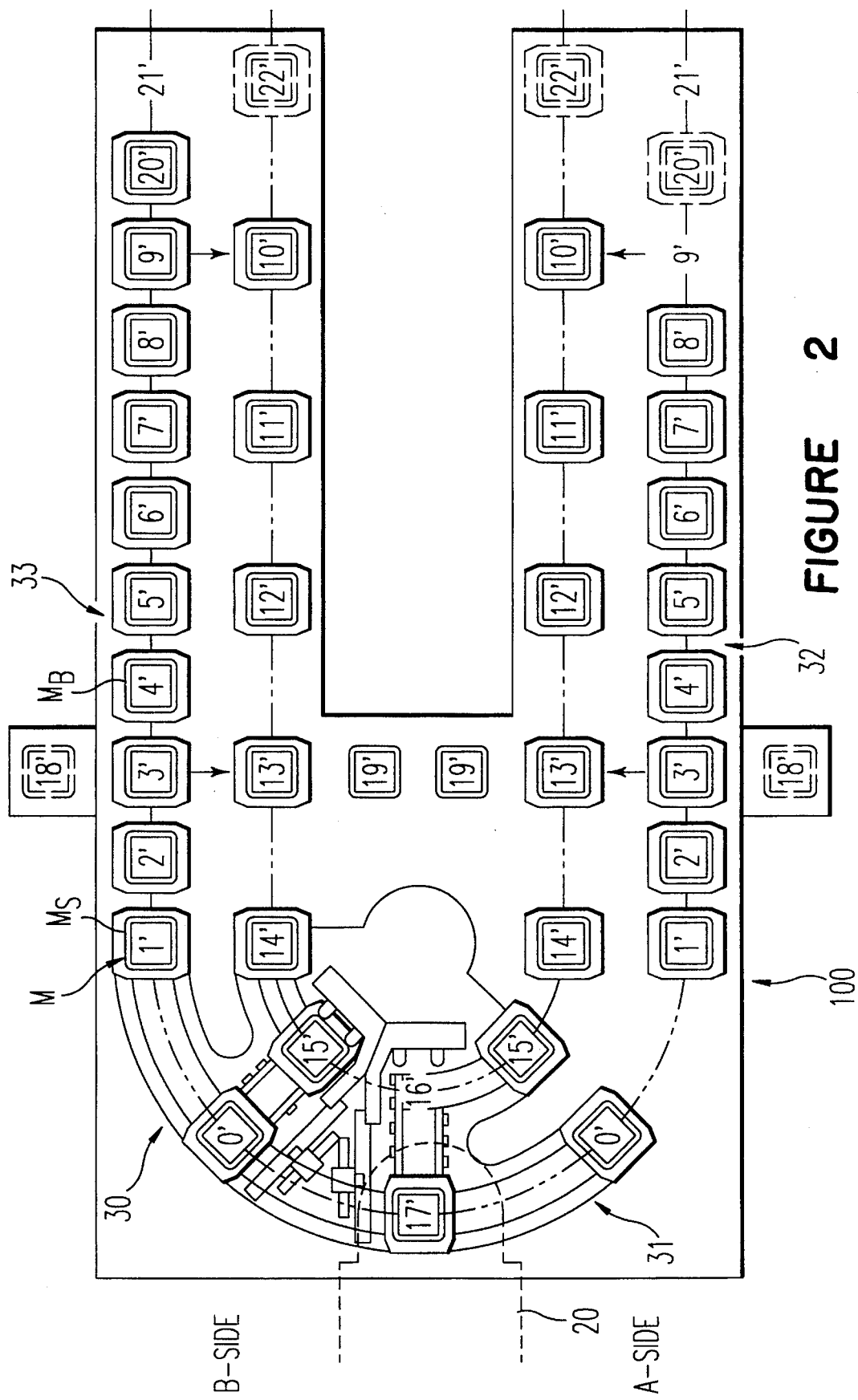
FIG. 2 is an explanatory diagram showing the total construction of an example of a molding device for a panel of a CRT to which this invention is applied.

FIG. 2 shows an example of a molding system of a panel for a CRT (hereinafter, simply a panel) to which the present invention is applied.

In FIG. 2, ST0' through ST22' (which are simply shown by numerals in circles in FIG. 2, and which are similarly described in the similar drawings) show the respective processing stages composing the molding system of a panel. ST17' designates a gob feeding stage wherein gob from an orifice (feeding port) 20 is fed to a female press-mold (a female mold wherein a shell mold MS is engaged with a periphery of a bottom mold MB) M at predetermined intervals. Interposing ST17', two routes (A-side and B-side in the Example) of the respective processing stages of ST0' through ST16' and ST18' through ST22', are provided in closed loops.

In this Example, ST0' designates a press-forming stage wherein a press-forming operation is performed with respect to the gob in the female press-mold M, ST1' and ST2', air forming stages wherein the press-mold panel is shaped in a form along the female press-mold M by blowing air, ST3', a shell mold removing stage wherein the shell mold MS is removed from the female press-mold M, ST4' through ST9', cooling stages wherein the press-formed panel is naturally cooled in the bottom mold MB which is removed of the shell mold MS, ST10', a cross transfer stage wherein the bottom mold MB in the cooling stage of ST9' is transferred in the right angle direction, ST11', a panel removing stage wherein the panel in the bottom mold MB is automatically removed, ST12', a panel removing stage wherein the panel is manually removed in starting the operation, ST13', a shell mold engaging stage wherein the shell mold MS is engaged with the bottom mold MB which is finished with the removing of the panel, ST14', a mold return waiting stage wherein the female press-mold M temporarily waits before returning the female press-mold M to the gob feeding stage ST17', ST15', a mold returning stage wherein the female press-mold M is returned to the gob feeding stage ST17', ST16', a dummy stage wherein a pusher 133, mentioned later, waits, ST18', a shell mold exchanging and removing stage wherein the shell mold MS which is removed from the female press-mold M and is malfunctioned (attached with defects or the like) is exchanged and removed or taken out to the outside of the system, ST19', a shell mold exchanging and fitting stage wherein a new shell mode MS is exchanged and fitted, ST20', a bottom mold exchanging and removing stage wherein a malfunctioned bottom mold MB is exchanged and removed or taken out to the outside of the system spare, ST21', a spare bottom mold exchanging and removing dummy stage wherein a malfunctioned bottom mold MB is exchanged and removed or taken out to the outside of the system, and ST22', a bottom mold exchanging and fitting stage wherein a new bottom mold MB is exchanged and fitted.

Figure 3:
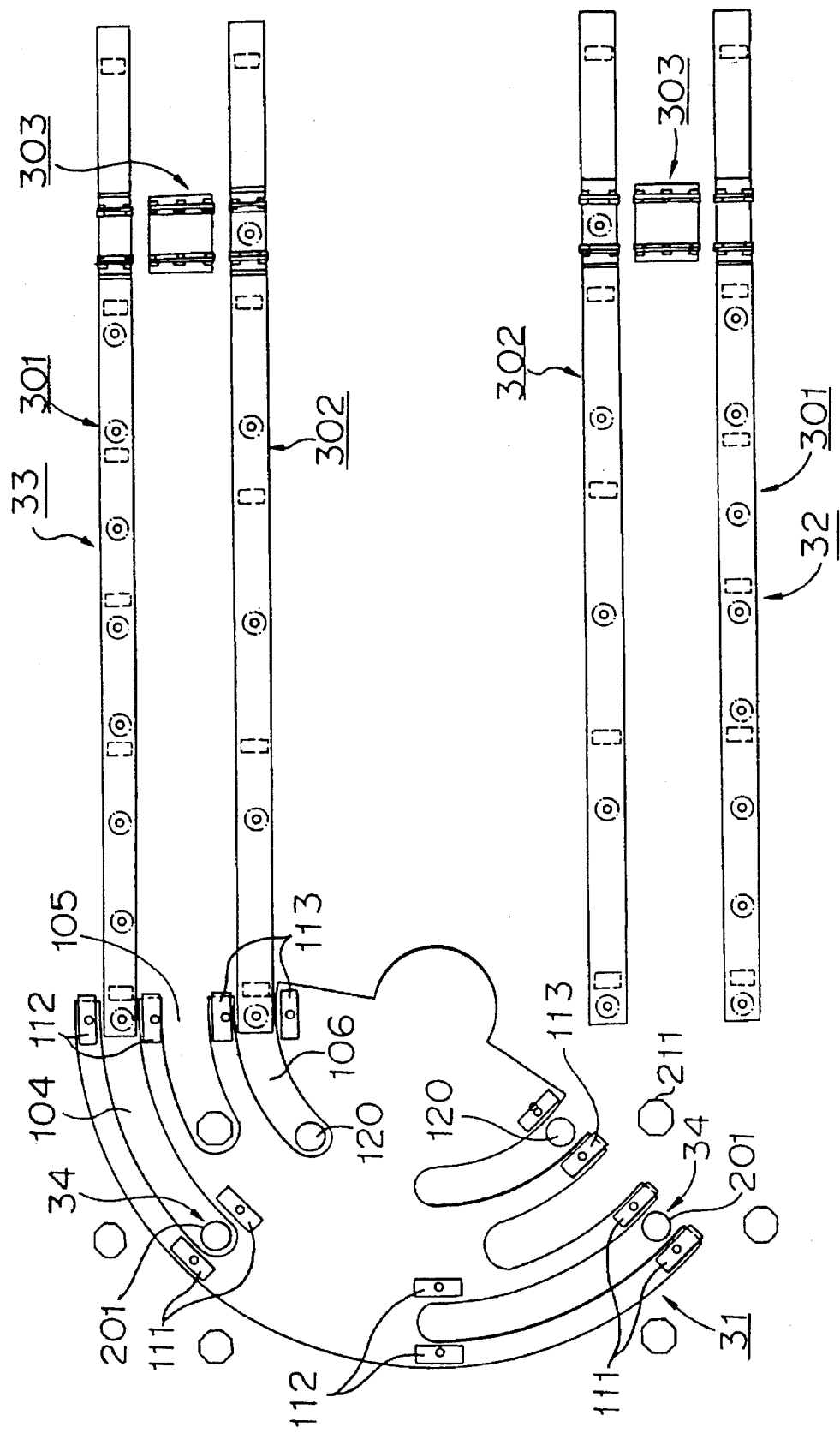
FIG. 3 is an explanatory diagram showing the total construction of a mold transferring system which is employed in Examples.

Further, in this example, the female press-molds M or the bottom molds MB are transferred to the respective processing stages by a mold transferring system 30 shown in FIGS. 2 and 3.

In FIGS. 2 and 3, the mold transferring system 100 comprises a swirl transfer device 31 which swirls the female press-molds M between a pair of the press-forming stages ST0', a pair of the air forming stages ST1', a pair of mold return waiting stages ST14' and a pair of the mold returning stages ST15', interposing the gob feeding stage ST17', an A-side linear transferring device 32 which linearly transfers the female press-molds M or the bottom molds MB among the air forming stage ST1 through the cooling stage ST9' and among the cross transfer stages ST10' through the mold waiting stages ST14', on the A-side and a B-side linear transverse device 33 which linearly transfers the female press-molds M or the bottom molds MB among the air forming stage ST1' through the cooling stage ST9' and among the cross transfer stages ST10' through the mold waiting stage ST14', on the B-side.

Further, a press-forming device 34 (see FIG. 12) is installed at the press-forming stage ST0'. A shell mold removing and engaging device 35 (see FIG. 16) is installed between the shell mold removing stage ST3' and the shell mold engaging stage ST13'. A panel removing device 36 (see FIG. 18) is installed at the panel removing stage ST11.

Female press-mold

Figure 5A:
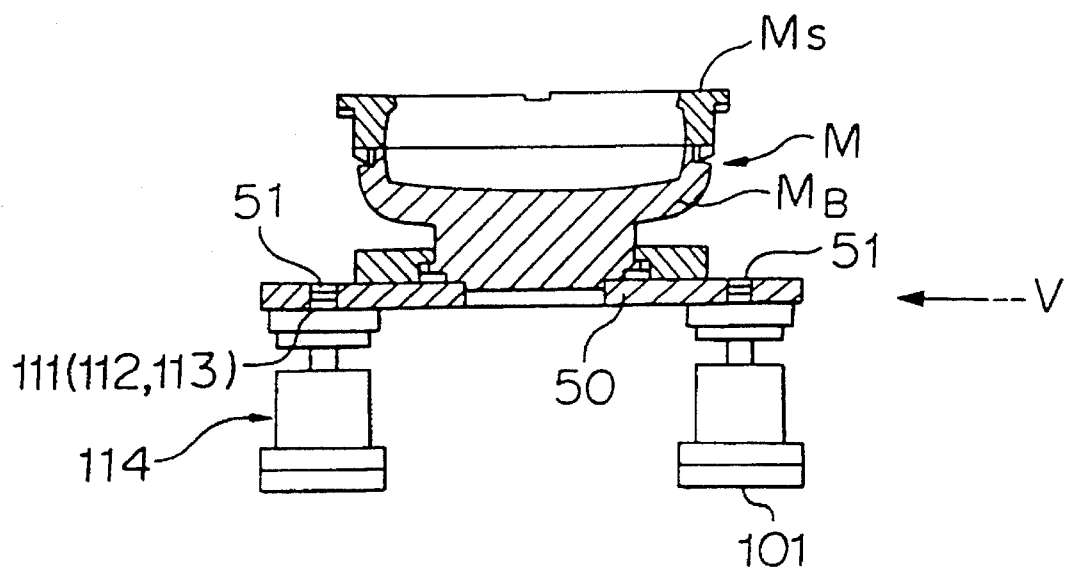
FIG. 5(a) is an explanatory diagram showing a relation among a female press-mold, a pallet and a lifter.
Figure 5B:
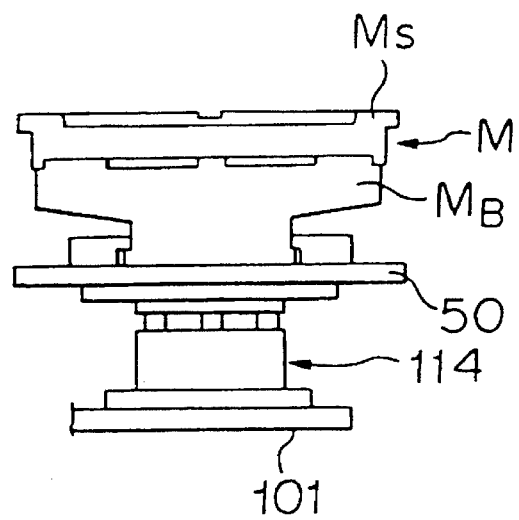
FIG. 5(b) is a diagram viewed in the direction of an arrow mark V in FIG. 5(a)

In this example, the female press-mold M comprises the bottom mold MB having a recess along the configuration of a panel which is an object of press-forming and the shell mold MS which attachably and detachably engages with a peripheral portion of the bottom mold MB and restrains the gob which is press-formed in the press-forming operation, from overflowing from the bottom mold MB, as particularly shown by FIGS. 5(a) and 5(b).

Further, the bottom mold MB is fixed on a pallet 50, and the female press-mold M or the bottom mold MB is transferred by the mold transferring system 30 integrally with the pallet 50.

Swirl transfer device

In this example, the swirl transfer device 31 is provided with a swirl table 101 which swirls between predetermined angular intervals.

Figure 4:
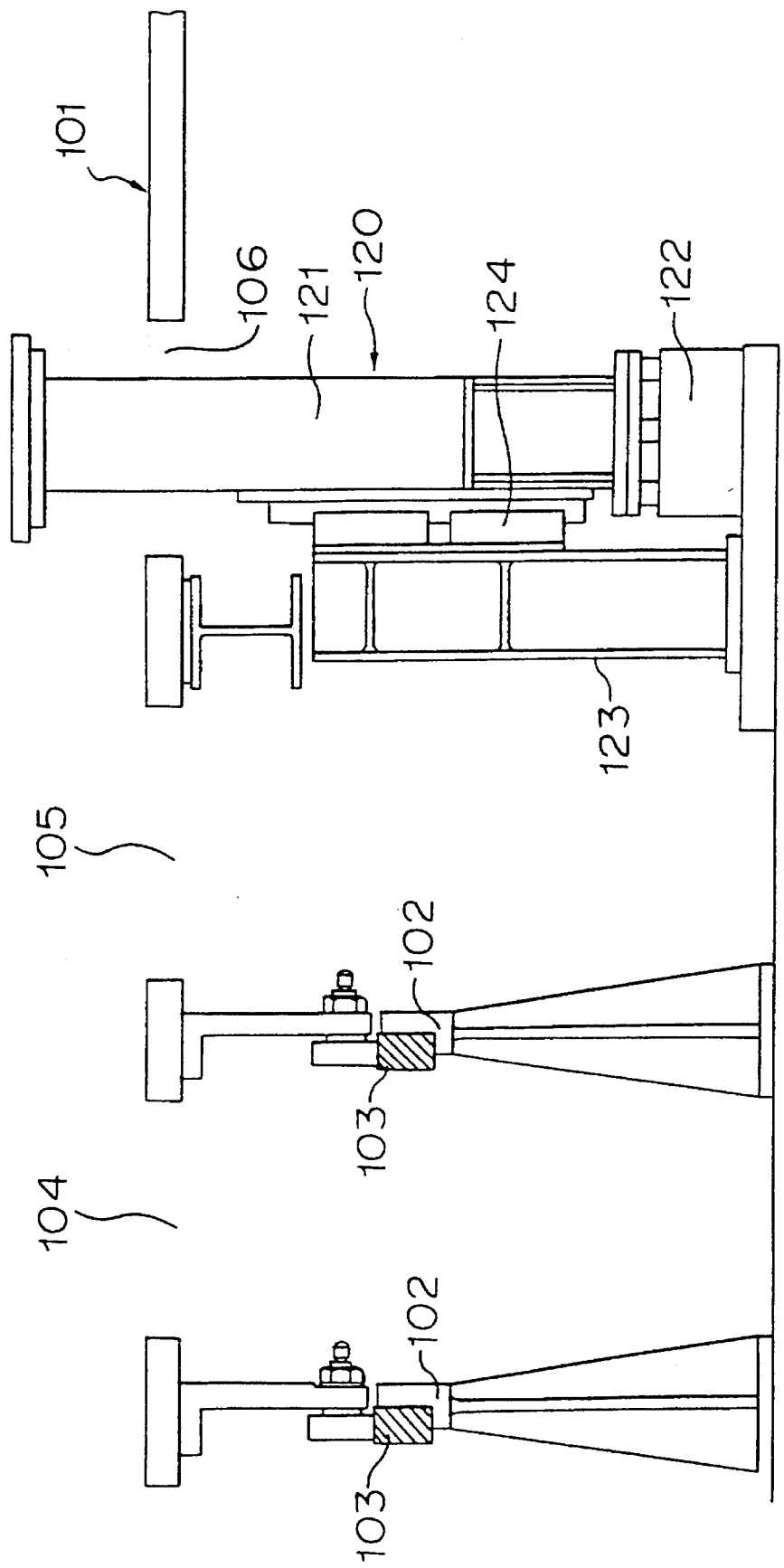
FIG. 4 is an explanatory diagram showing a support structure of a swirl type transfer device employed in Examples.

As particularly shown by FIGS. 3 and 4, this swirl table 101 is of a fan shape having an opening angle of approximately 150 degrees, which is provided with a rotating axis, not shown, as a center of swirl, and which is swirlably supported along a guide rail 102 having a swirl shape through movable casters 103. The rotating axis is reciprocated to rotate in a predetermined angular range by a driving motor, not shown.

The swirl table 101 is formed in a symmetrical shape with respect to a center line. Cut-in slits 104, 105 and 106 each having an arcuate locus shape, are formed on the both sides of the swirl table 101 provided in this order from the outer periphery of the swirl table, to avoid interference with, a press mounting table 201 installed at the press-forming stage ST0', a portion of a support column 211 supporting a plunger 210 (see FIG. 12) of the press-forming device 34 (see FIG. 12), and a movable anvil 120 installed in the mold returning stage ST15.

Further, pairs of positioning outer pins 111 and 112 are installed on both sides of the open end and the closed end of the cut-in slit 104 which is placed at the outermost peripheral position of the swirl table 101. A pair of positioning inner pins 113 are installed on both sides of the open end of the cut-in slit 105 which is placed at the innermost peripheral position.

Figure 6:
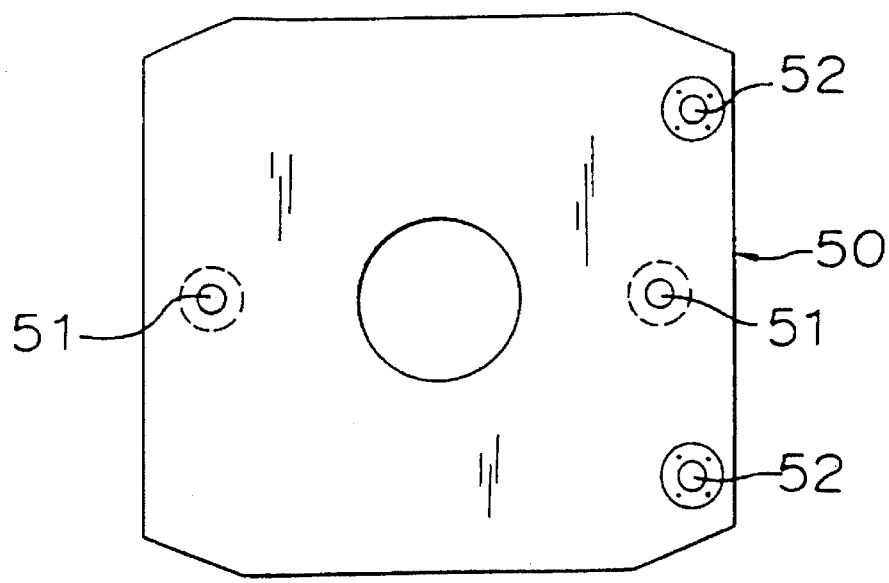
FIG. 6 is a plane view of a pallet employed in Examples.
Figure 7:
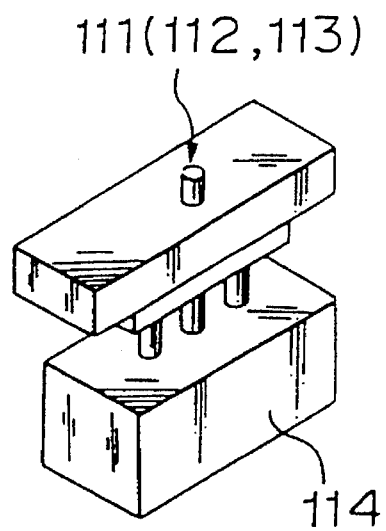
FIG. 7 is a perspective view of a lifter employed in Examples.

These positioning outer pins 111 and 112 and positioning inner pins 113 are vertically movably supported by vertical moving lifters 114 which are fixed to the swirl table 101 and each of which is composed of an air cylinder and the like (having the vertical stroke of approximately 25 mm in this example), as shown in FIGS. 5 through 7, which engage with positioning holes 51 that are opened for the female press-mold on the both sides of the pallet 50 M in the width direction.

As shown in FIG. 4, in the movable anvil 120 employed in this example, the support column 121 is fixed to a vertical lifter 122 such as an air cylinder or the like (having the vertical stroke of approximately 25 mm in this example), and is slidably guided along a support column 123 through a guide slider 124 to prevent falling-down of the vertical posture of the support column 121.

Figure 8:
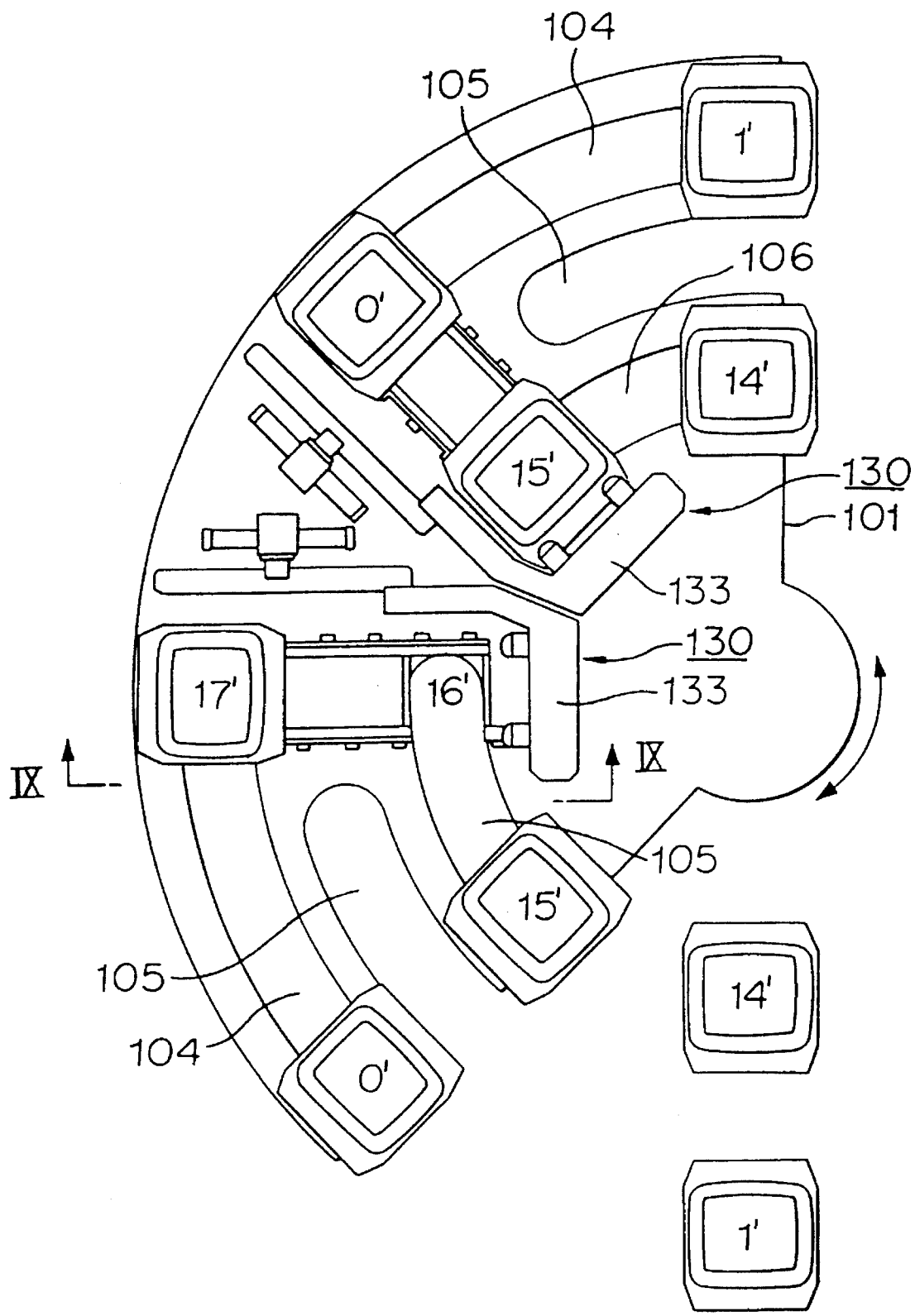
FIG. 8 is an explanatory diagram showing the outline of a pushing guide mechanism employed in Examples.

As shown in FIG. 8, a pair of pushing guide mechanisms 130 are installed on the swirl table 101, which returns a new female press-mold M transferred to the mold returning stage ST15' to the gob feeding stage ST17'.

In the pushing guide mechanism 130 of this example, a pair of guide rails 131 (see FIG. 9) are laid along the radial direction of the swirl table 101, spanning over the closed ends of the cut-in slits 104 and 106 of the swirl table 101, rotatable guide rolls 132 are arranged on the guide rails 131 at predetermined intervals, and the female press-mold M placed on the guide rolls 132 is transferred to the gob feeding stage ST17' from the mold returning stage ST15' by a pushing force of the pusher 133.

Figure 9:
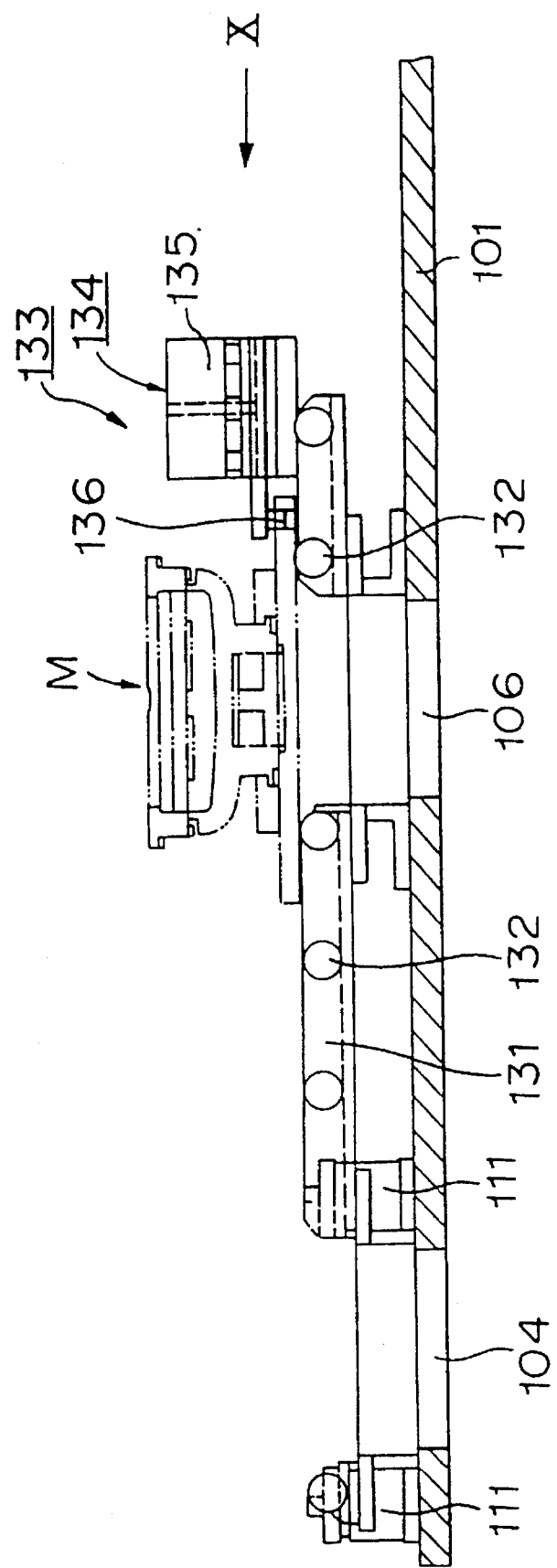
FIG. 9 is a diagram viewed in the direction of IX in FIG. 8.

As particularly shown in FIGS. 9 through 11, in the pusher 133 employed in this example, a pair of pusher pins 136 are provided which vertically move a pusher mainbody 134 by actuators 135 such as air cylinders or the like on the side pushing the pusher mainbody 134, the pusher pins 136 are engaged with a pair of engaging holes 52 which are opened on one side of the pallet 50, and the female press-mold M is pushed through the pallet.

Further, in the drive system of the pusher 133, a crank mechanism 143 is connected to an actuator 142 which is rotated by hydraulic pressure from a hydraulic cylinder 141, the motion is transferred to a crank arm 144 of the crank mechanism 143 and is transferred to a pusher supporting plate 147 placed on the guide rolls 132, through an engaging pin 145 and another crank arm 146 having an engaging groove of the crank mechanism 143, which provides a linear stroke to the pusher 133 which is necessary for returning the female press-mold M to the gob feeding stage ST17'. Further, in FIGS. 10 and 11, numeral 148 designates a position binding slide mechanism which binds and slides the pusher supporting plate 147 along the pushing direction of the pusher 133, and 149, a slit opened at swirl table 101 in correspondence with the moving stroke of the link arm 146.

Press-forming device

Figure 12:
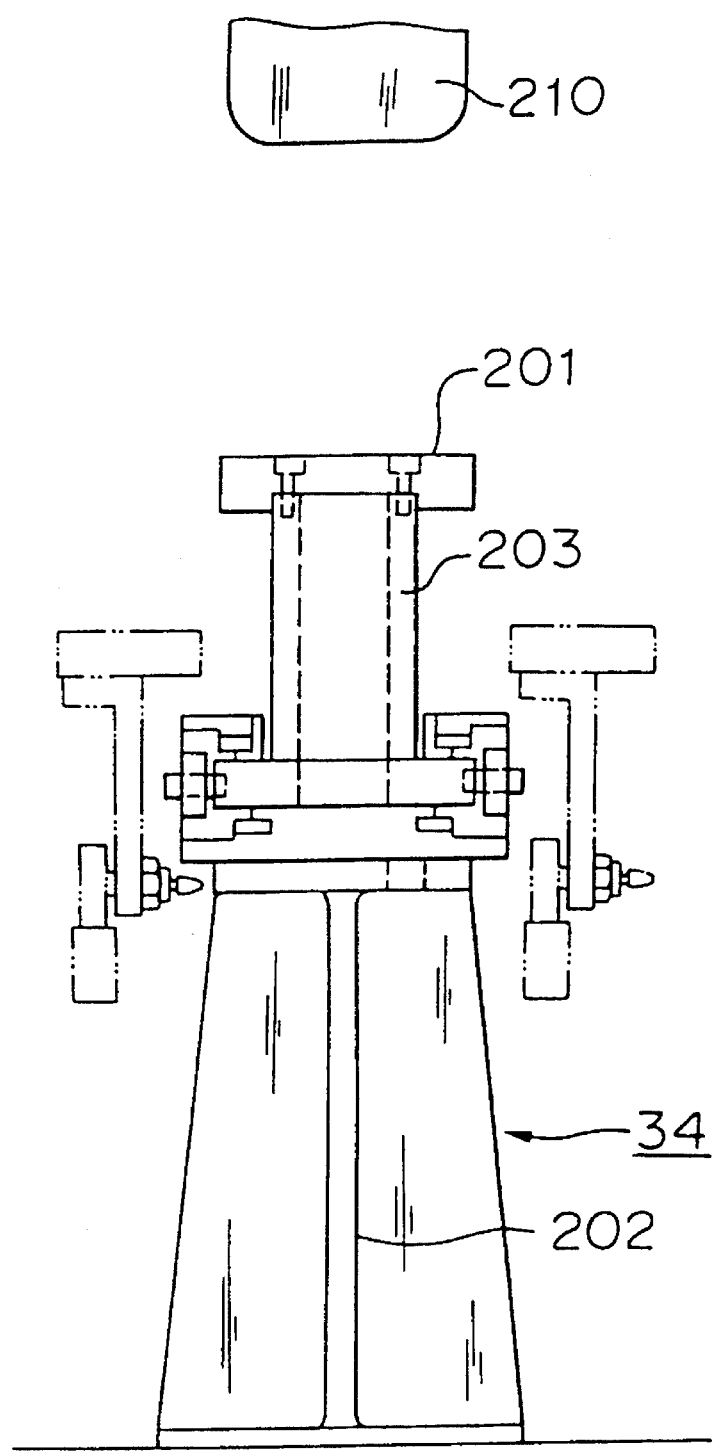
FIG. 12 is an explanatory diagram showing a press-forming device employed in Example.

As shown in FIG. 12, in the press-forming device 34, the press mounting table 201 is provided on a fixed base 202 through a column 203 supporting a vertical motion of a hydraulic cylinder or the like, and the plunger 210 is provided above and corresponding to the press mounting table 201 through a vertical moving mechanism, not shown.

Linear transfer device

As shown in FIGS. 3, 13(a), 13(b) and 14, the linear transferring devices 32 and 33 employed in this example, each comprises an outer linear transfer device 301 which transfers the female press-mold M or the bottom mold MB from the air forming stage ST1' to the cooling stage ST9', an inner linear transfer device 302 which transfers the female press-mold M or the bottom mold MB from the cross transfer stage ST10' to the mold return waiting stage ST14', and a cross transfer device 303 which cross-transfers the bottom molds MB from the cooling stage ST9' to the cross-transferring stage ST10'.

In this example, in the outer linear transfer device 301, a pair of travelling beams 313 which are extended in the longitudinal direction are slidably provided on a pair of fixed supporting beams 311 which are extended in the longitudinal direction, through slide bearings 312 provided at predetermined intervals, and the travelling beams 313 are connected to a crank drive mechanism 314 that provided between the pair of the travelling beam 313, through a connecting arm 315, whereby the travelling beams 313 are reciprocated by the cranking motion of the crank drive mechanism 314 by an interval of one pitch between the respective processing stages ST.

Further, a fixed anvil 316 is installed between the pair of the travelling beams 313 which is extended in the longitudinal direction, on which the female press-molds M or the bottom molds MB are placed through the pallets 50 at the respective processing stages ST.

Further, positioning pins 317 corresponding to the positioning holes 51 of the pallets 50 which can be vertically moved by lifters 318 such as air cylinders, are supported at positions of the traveling beam 313 corresponding to the respective processing stages. The reciprocating motion of the travelling beam 313 and the vertical motion of the positioning pins 317 are corporated with each other, the pallet 50 placed on the fixed anvil 316 is separated once from the fixed anvil 316 and is transferred to the next processing stage ST by a so-called walking beam system.

That is, in starting the travelling motion of the travelling beam 313, the positioning pins 317 engage with the positioning holes 51 of the pallets 50 by lifting by the lifters 318, the pallets 50 are separated from the fixed anvil 316, the travelling beams 313 travel in this state, the female press-molds M or the bottom molds MB placed on the fixed anvil 316 at the respective processing stages ST are transferred to the succeeding processing stages ST, under this state, the positioning pins 317 are lowered by lowering by the lifters 318, firstly, the pallets 50 are placed on the fixed anvil 316, the positioning pins 317 are detached from the positioning holes of the pallets 50, and thereafter, the travelling beams 313 are retracted to their initial position. In this way, it is possible to select the female press-mold M or the bottom mold MB that is transferred in a certain transfer step, and to individually determine the stop time at the respective processing stages ST.

Further, the inner linear transfer device 302 is different from the outer linear transfer device 301 in its pitch between the respective processing stages ST and the transfer direction of the mold. However, the inner linear transfer device 302 is basically provided with components similar to those in the outer linear transfer device 301 except the layout of the crank drive mechanism 314. The components of the inner linear transfer device 302 which are similar to those in the outer linear transfer device 301 are attached with the same notations and a detailed explanation thereof is omitted.

Further, as shown in FIG. 15, in the cross transfer device 303, guide rolls 332 are arranged on a pair of guide rails 331 spanning between the cooling stage ST9 and the cross transferring stage ST10', guide bars 333 are provided above the guide rails 331, a movable shoe 334 which is forward-and-backward movably supported along the guide bars 333, is forwardly and backwardly moved by a crank drive mechanism 335, further, a supporter 336 hangs from the movable shoe 334, a transfer pin 338 which vertically moves by an actuator 337 such as an air cylinder, is attached to the distal end of the support arm 336, and the mold on the pallet 50 is transferred from the cooling stage ST9' to the cross transfer stage ST10', in a state wherein the transfer pin 338 is engaged with the positioning hole 51 of the pallet 50.

Shell mold engaging and removing device

As shown in FIG. 16, in the shell mold removing and engaging device 35 employed in this example, guide bars 401 are provided which span over the shell mold exchanging and removing stage ST18', the shell mold removing stage ST3', the shell mold engaging stage ST13' and the shell mold exchanging and fitting stage ST19', a shell mold attaching and detaching unit 402 is forwardly and backwardly moved between the shell mold removing stage ST3' and the shell mold engaging stage ST13' along the guide bar 401, further, a shell mold removing unit 403 moves forwardly and backwardly between the shell mold engaging stage ST3' and the shell mold exchanging and removing stage 18, and a shell mold fitting unit 404 is forwardly and backwardly moves between the shell mold engaging stage ST13' and the shell mold exchanging and fitting stage ST19'.

Figure 17:
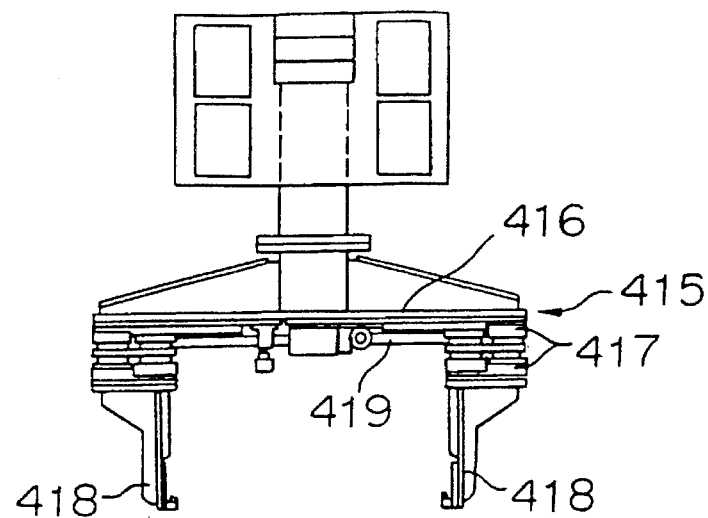
FIG. 17 is a diagram of a shell mold holding hand in FIG. 16 viewed from the direction of an arrow mark XVII.

In this example, in the shell mold attaching and detaching unit 402, a movable shoe 411 which slides along the guide bars 401 is provided, a guide support 412 is provided to the movable shoe 411 which extends downwardly, a vertically moving arm 413 is slidably attached along the guide support 412 which can vertically move by the driving force of an air cylinder 414, and a shell mold holding hand 415 is attached to the distal end of the vertically moving arm 413. Further, as shown in FIG. 17, in the shell mold holding hand 415 in this example, a pair of movable hand members 418 are slidably attached to a hand mainbody 416 that is fixed to the vertical moving arm 413 through sliders 417, the pair of movable hand members 418 are pertinently opened or closed in the approaching and departing direction by a ball screw mechanism 419 or the like, and the shell mold holding hand 415 is attached to or detached from the shell mold MS.

Accordingly, in this shell mold attaching and detaching unit 402, the forward and backward movement of the movable shoe 411 along the guide bar 401, the vertical movement of the vertically moving arm 413 and the opening and closing movement of the shell mold holding hand 415 cooperate with each other, thereby engaging the shell mold MS which has been removed at the shell mold removing stage ST3' to the bottom mold MB at the shell mold engaging stage ST13'.

Further, the shell mold removing unit 403 and the shell mold fitting unit 404 are constructed similar to the shell mold attaching and detaching unit 402. In normal time, the shell mold removing unit 403 waits at the shell mold exchanging and removing stage ST18, and removes a malfunctioned shell mold MS at the shell mold removing stage ST3'. Further, in normal time, the shell mold fitting unit 404 waits at the shell mold exchanging and fitting stage ST19', and fits a new shell mold to the bottom mold MB at the shell mold engaging stage ST13'.

Panel removing device

Figure 18:
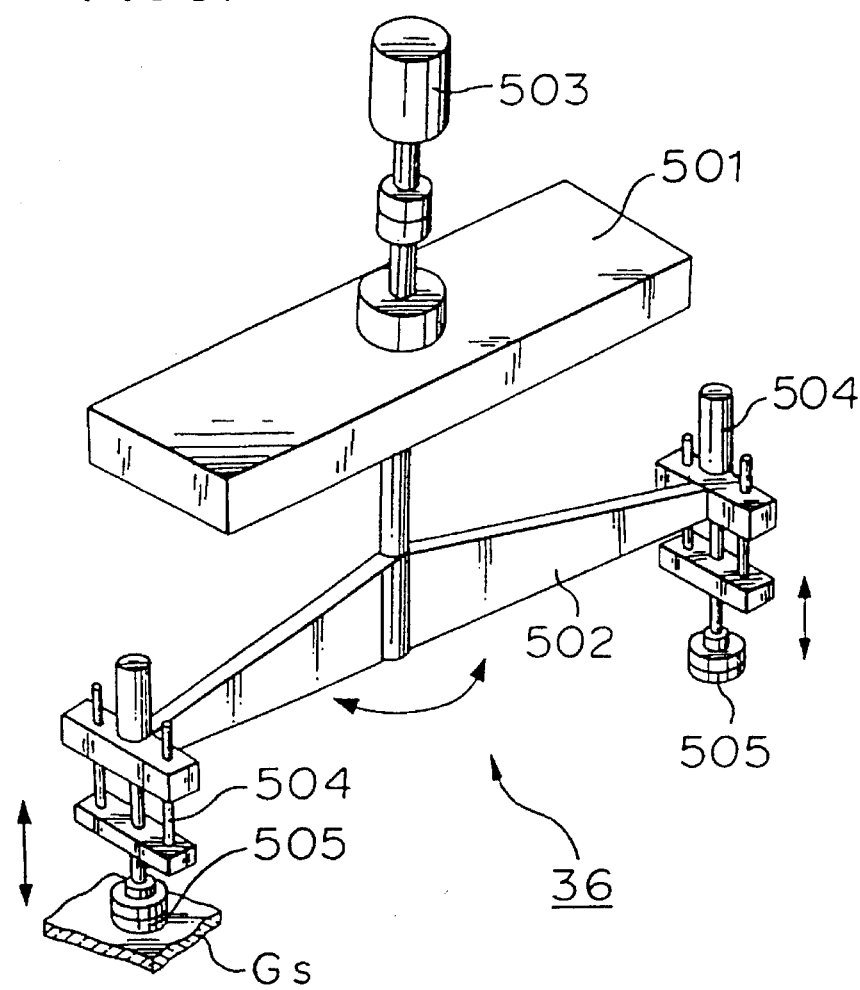
FIG. 18 is an explanatory diagram showing a glass product removing device for a panel of a CRT employed in Examples.

As shown in FIG. 18, in the panel removing device 36 employed in this example, a bifurcated arm 502 is rotatably supported by a frame 501 which is fixed above the panel removing stage ST11', a bifurcated arm 502 is swirled by a swirl motor 503 by 180 degrees, vacuum chucks 505 are attached to the respective distal ends of the bifurcated arms 502 through vertically moving cylinders 504, the swirl notion of the swirl motor 503, the vertical motion of the vertically moving cylinders 504 and the vacuum suction and release motion of the vacuum chuck 505 corporate with each other, and the panels GS are alternately removed at the panel removing stage ST11', by the vacuum suction of the pair of the vacuum chucks 505. After one of the vacuum chucks 505 contacts the glass product (GS), it is lifted, swirled by the swirl motor 503 by 180 degrees, and lowered onto a conveyor, not shown. The other one of the vacuum chucks 505 successively performs the above operation.

Operation of the molding device of a panel

Figure 19:
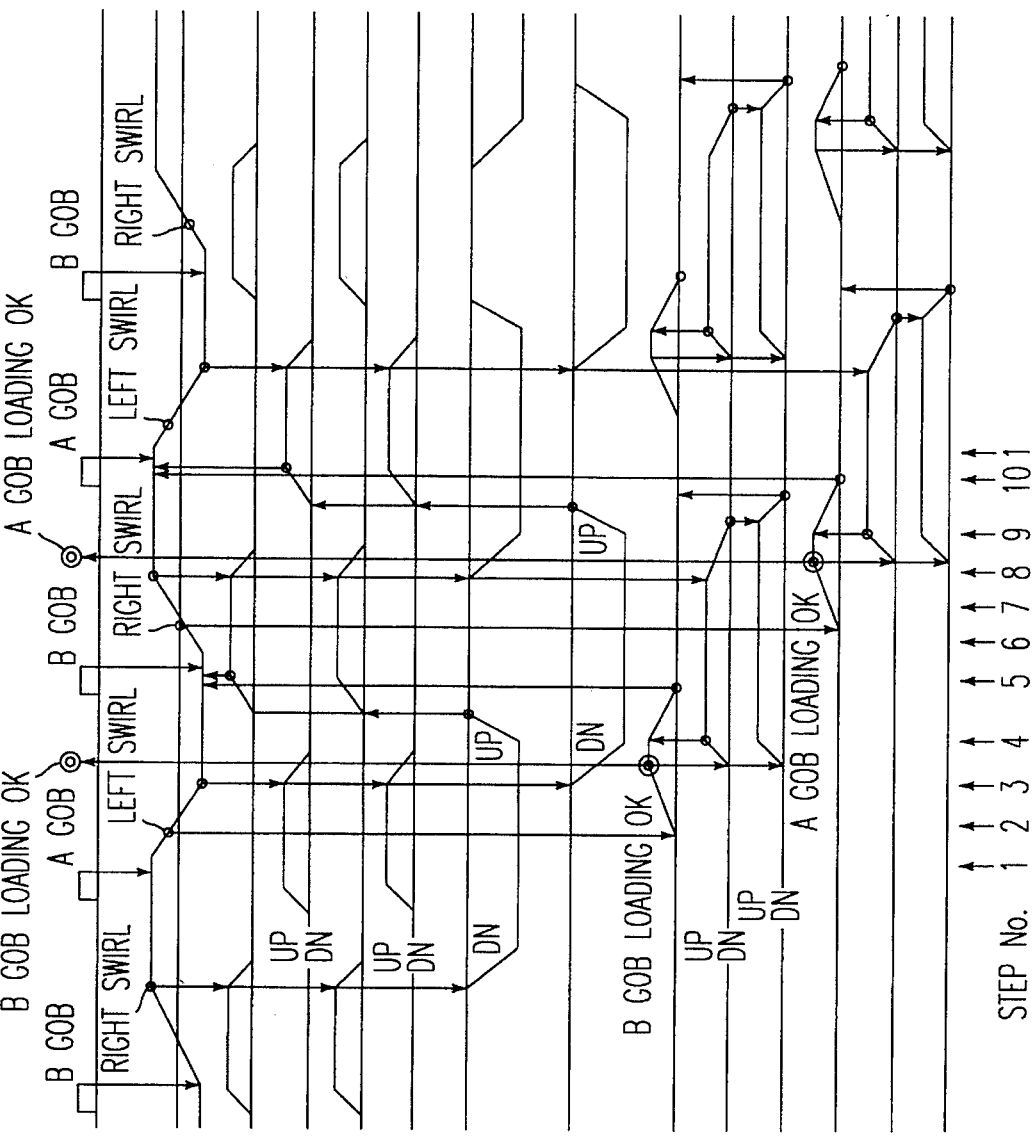
FIG. 19 shows timing charts indicating operational states of a female press-mold distributing device, a female press-mold returning device and a press-forming device in a molding device for a panel of a CRT employed in Example 1.
Figure 20:
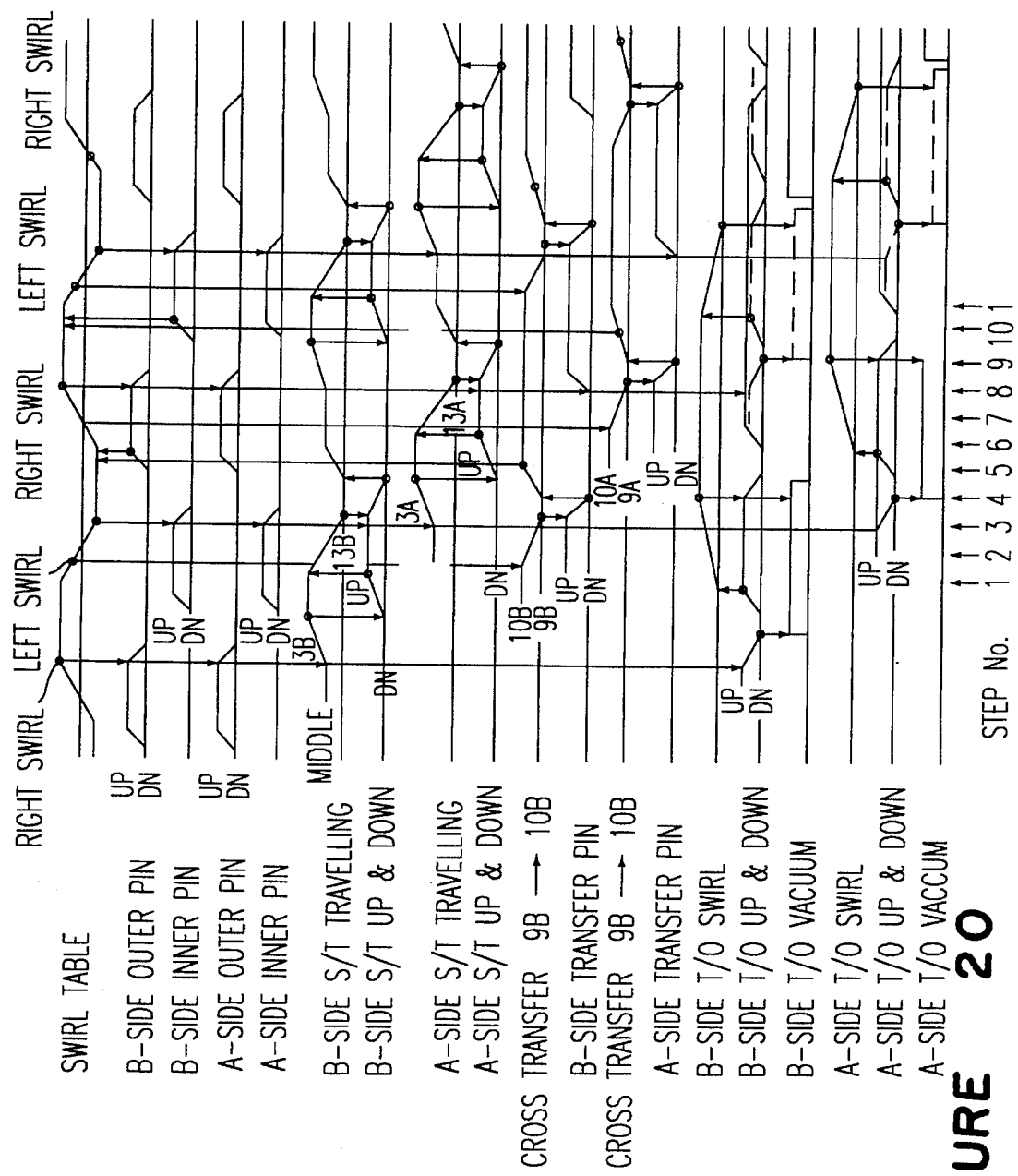
FIG. 20 shows timing charts indicating operational states of linear transfer devices, a cross transfer device and a glass product removing device in a molding device for a panel of a CRT employed in Example 1.
Figure 21:
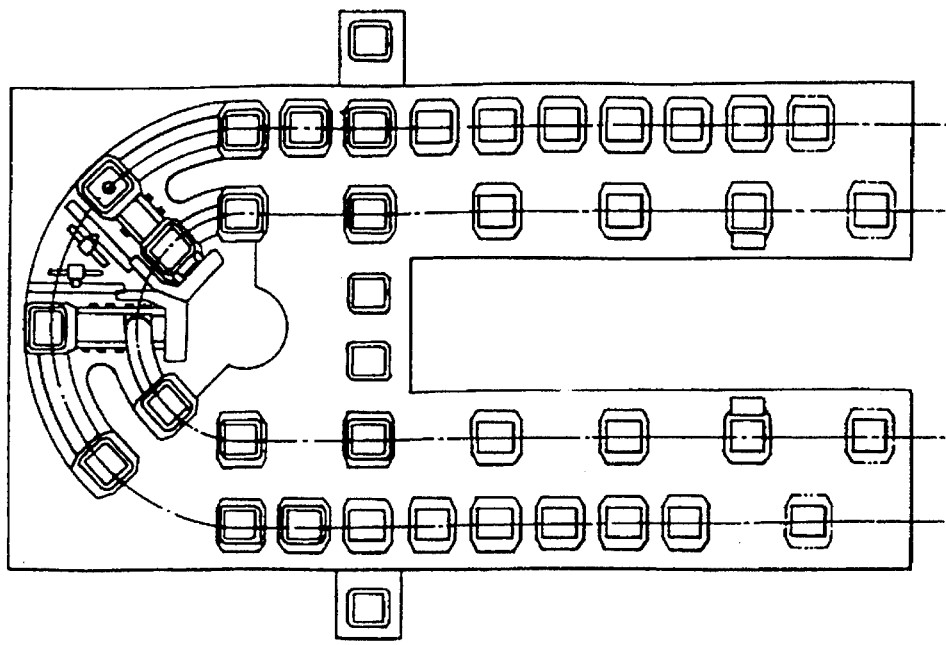
FIG. 21 is a schematic diagram showing the motional step (1) of a molding device for a panel of a CRT employed in Example 1.
Figure 22:
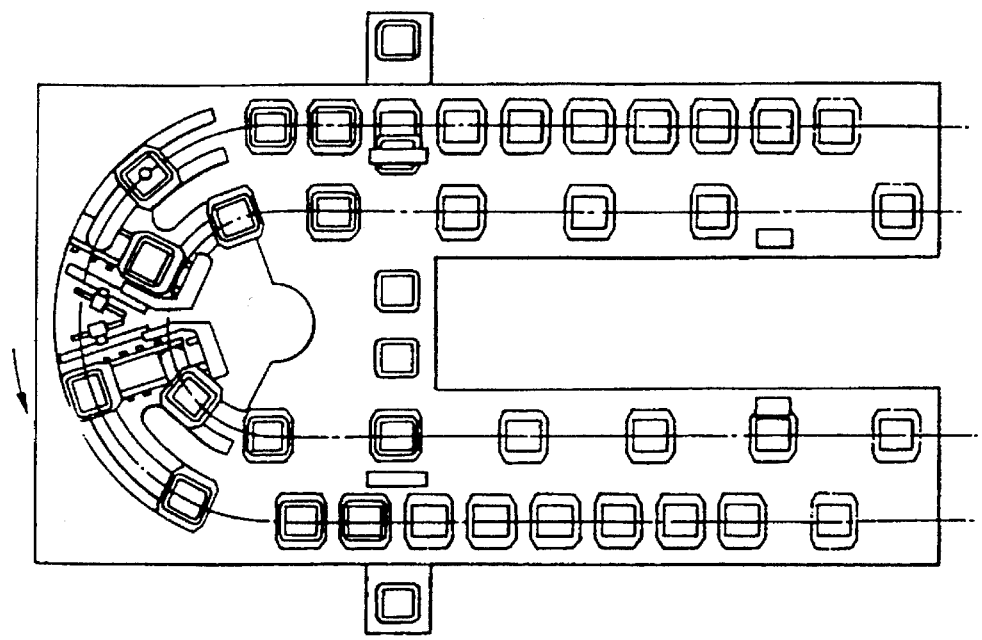
FIG. 22 is a schematic diagram showing the motional step (2) of a molding device for a panel of a CRT employed in Example 1.
Figure 23:
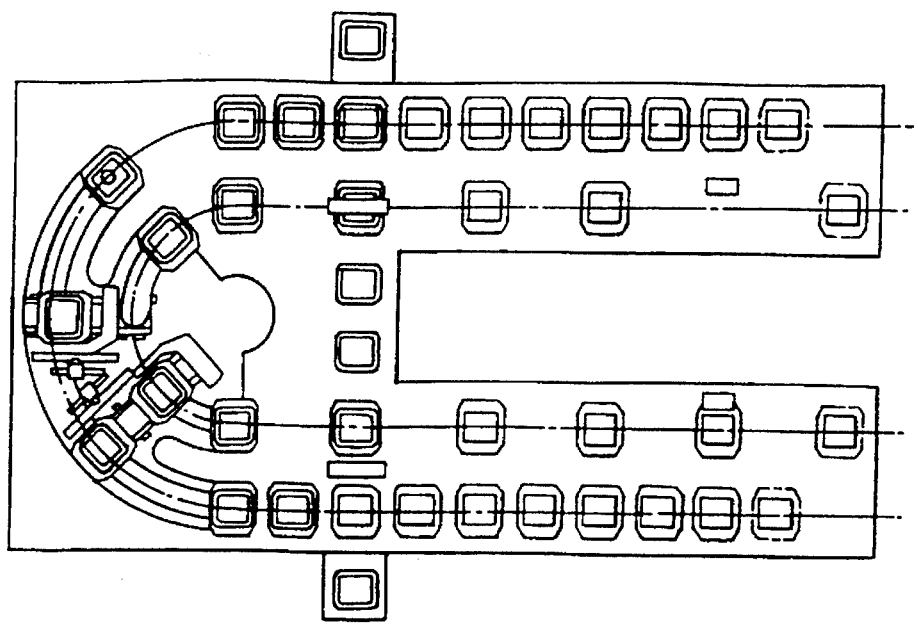
FIG. 23 is a schematic diagram showing the motional step (3) of a molding device for a panel of a CRT employed in Example 1.
Figure 24:
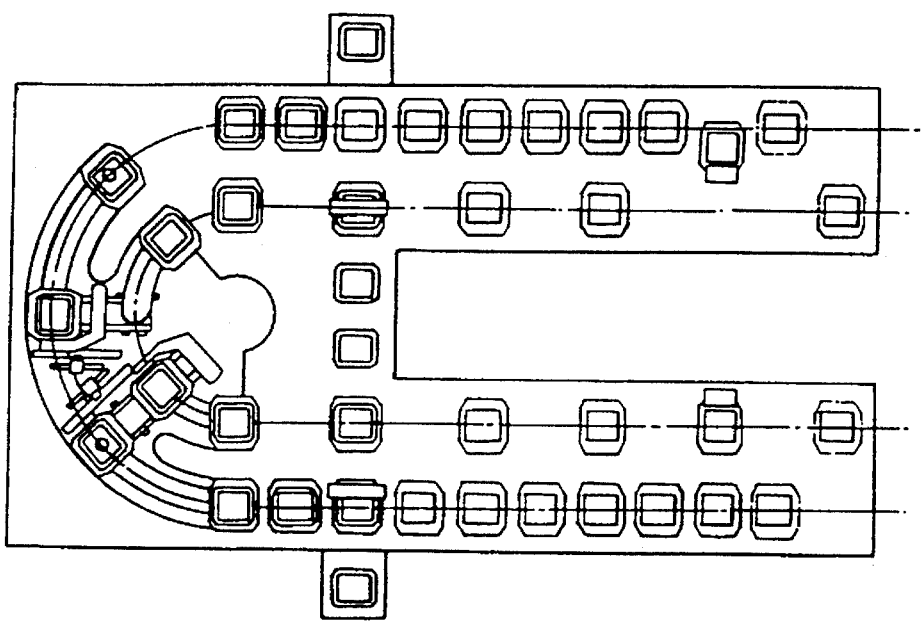
FIG. 24 is a schematic diagram showing the motional step (4) of a molding device for a panel of a CRT employed in Example 1.
Figure 25:
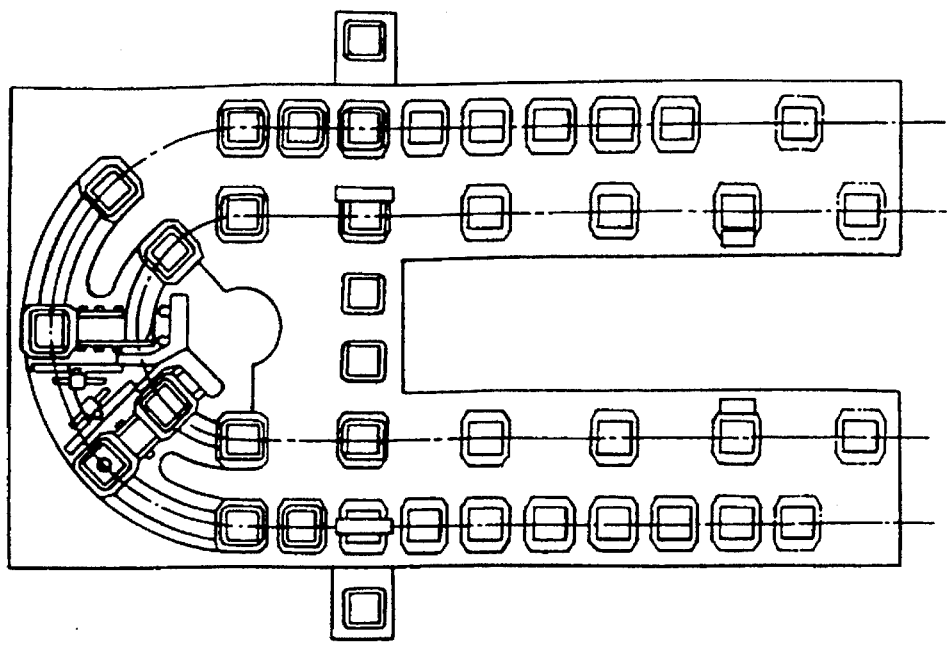
FIG. 25 is a schematic diagram showing the motional step (5) of a molding device for a panel of a CRT employed in Example 1.
Figure 26:
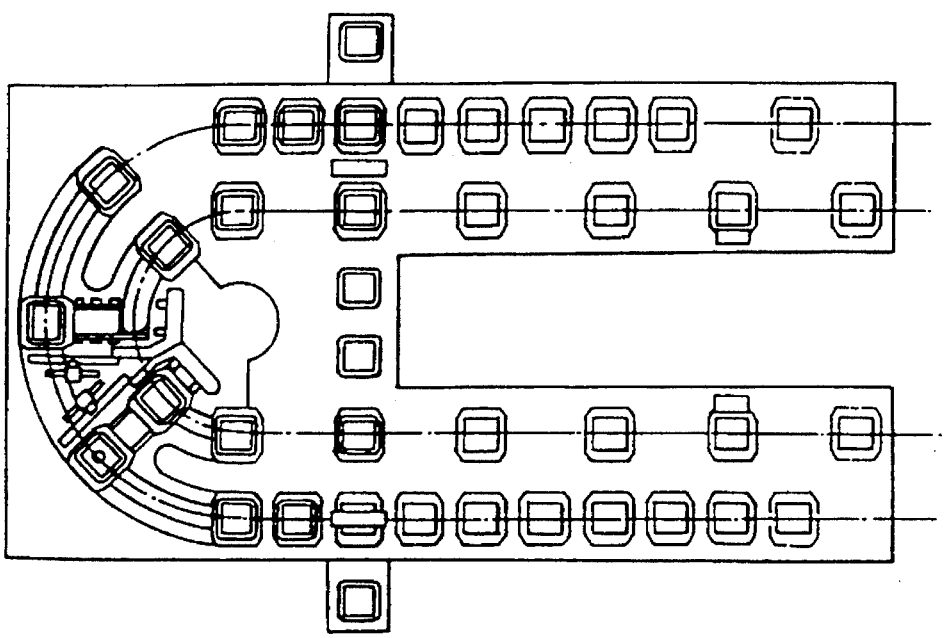
FIG. 26 is a schematic diagram showing the motional step (6) of a molding device for a panel of a CRT employed in Example 1.
Figure 27:
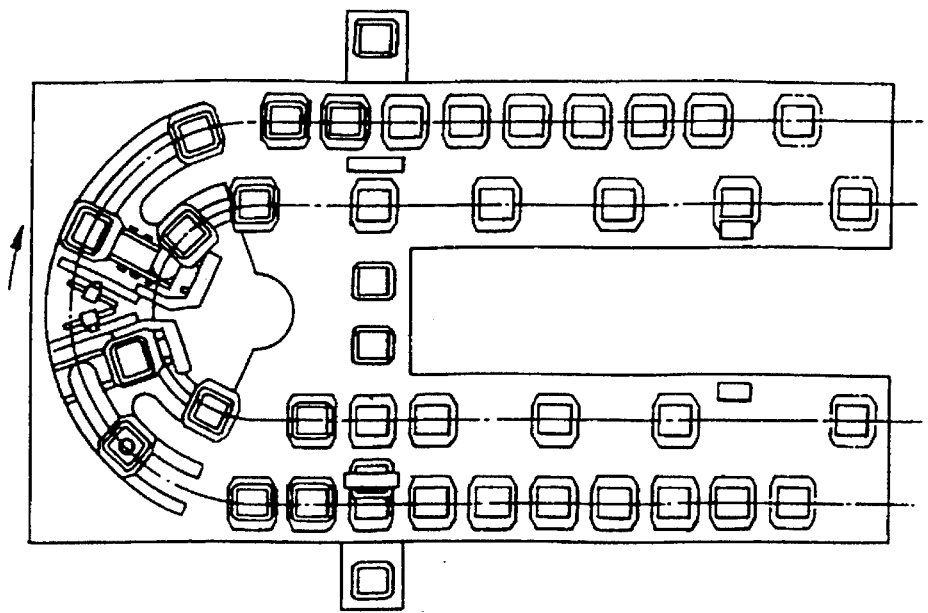
FIG. 27 is a schematic diagram showing the motional step (7) of a molding device for a panel of a CRT employed in Example 1.
Figure 28:
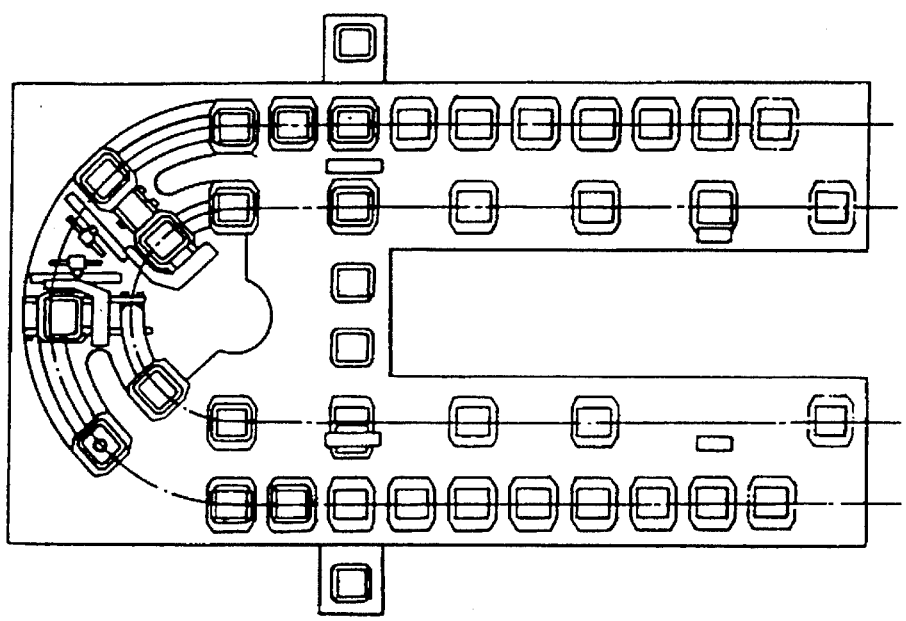
FIG. 28 is a schematic diagram showing the motional step (8) of a molding device for a panel of a CRT employed in Example 1.
Figure 29:
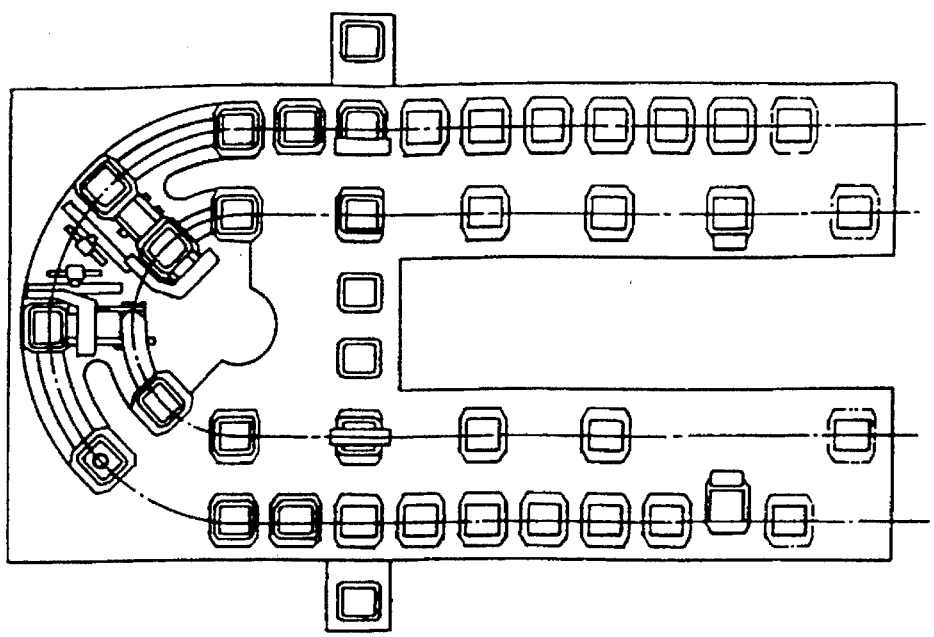
FIG. 29 is a schematic diagram showing the motional step (9) of a molding device for a panel of a CRT employed in Example 1.
Figure 30:
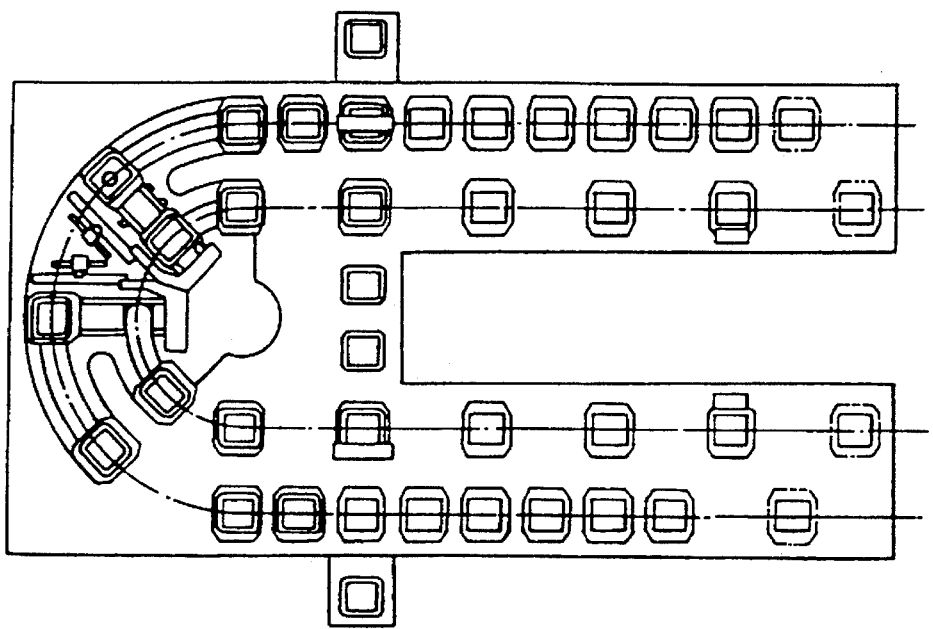
FIG. 30 is a schematic diagram showing the motional step (10) of a molding device for a panel of a CRT employed in Example 1.

The panel forming device according to this example is controlled by a controller, not shown, in accordance with the operational timings in FIGS. 19 and 20.

In FIG. 19, A gob at shear cut timing chart designates a timing wherein the gob is fed to the A-side, and B gob, a timing wherein the gob is fed to the B-side.

Further, with respect to the swirl table timing chart, a rise to right designate a swirl to the right direction, and a fall to left, a swirl to the left direction. Further, the up-and-down motions of the respective outer pins 111 and 112 and the inner pins 113 on the A-side and B-side, are shown by UP and DN.

Further, in the plunger A and the plunger B timing charts, the up-and-down movements of the plungers 210 at the press-forming stages ST0' on the A-side and the B-side, are shown by UP and DN.

Further, the female press-mold loading timing chart designates a movement locus of the pusher 133 when the female press-mold M is returned from the mold returning stages ST15' on the A-side and B-side to the gob feeding stage ST17', and the motions of the pusher pins 136 on the A-side and B-side and the movable anvils 120 are shown by the timing charts of 15A pusher pin, 15A movable anvil, 15B pusher pin, and 15B movable anvil, wherein the up-and-down movement are shown by UP and DN.

Further, in FIG. 20, the timing charts of the swirl table, the outer pins and inner pins on the A-side and the B-side are the same as in FIG. 19. The timing charts of A-side and B-side S/T travelling show the forward and backward movement of the the shell mold engaging and removing devices 35 on the A-side and the B-side, and the timing charts of A-side and B-side S/T "up and down" show the up-and-down movements of the the shell mold engaging and removing devices 35 by UP and DN. In the timing charts of the S/T travelling, "middle" indicates that the shell mold engaging and removing device 35 stops and waits while the shell mold (MS) is being transferred from the shell mold removing stage ST3' to the shell mold engaging stage ST13'.

Further, the timing charts of the cross transfer 9A (9B) to 10A (10B) indicate the forward and backward movement of the movable shoe 334 of the cross transfer device 303, and the timing charts of A-side transfer pin and B-side transfer pin show the up-and-down movements of the A-side and B-side transfer pins 338 by UP and DN.

Further, the timing charts of A (B)-side T/O swirl indicate the swirl movements of the swirl motor 503 of the panel removing device 36, the timing charts of A (B)-side T/O up and down indicate the up-and-down movement of the vertically moving cylinder 504 by UP and DN, and the timing charts of A (B)-side T/O vacuum indicate the vacuum suction and release motion of the vacuum chuck 505. Further, in the timing charts of A (B)-side T/O up and down and the A (B)-side T/O vacuum, the dotted lines designate the operation state on the counter side of the pair of vacuum chucks 505 for reference.

FIGS. 21 through 30 schematically show the operational states of the device in steps of No. 1 through No. 10 in the timing charts of FIGS. 19 and 20. The o mark at the press-forming stage ST0' indicates the press-forming is being performed.

According to these schematical diagrams, it is shown that in the step of transferring the female press-mold M to the press-forming stage ST0' on the A-side, the press-forming is performed at the press-forming stage ST0' on the B-side, and at the same time, the next female press-mold M placed at the mold returning stage ST15' on the B-side is set to the gob feeding stage ST17'.

Variational example

Figure 31:
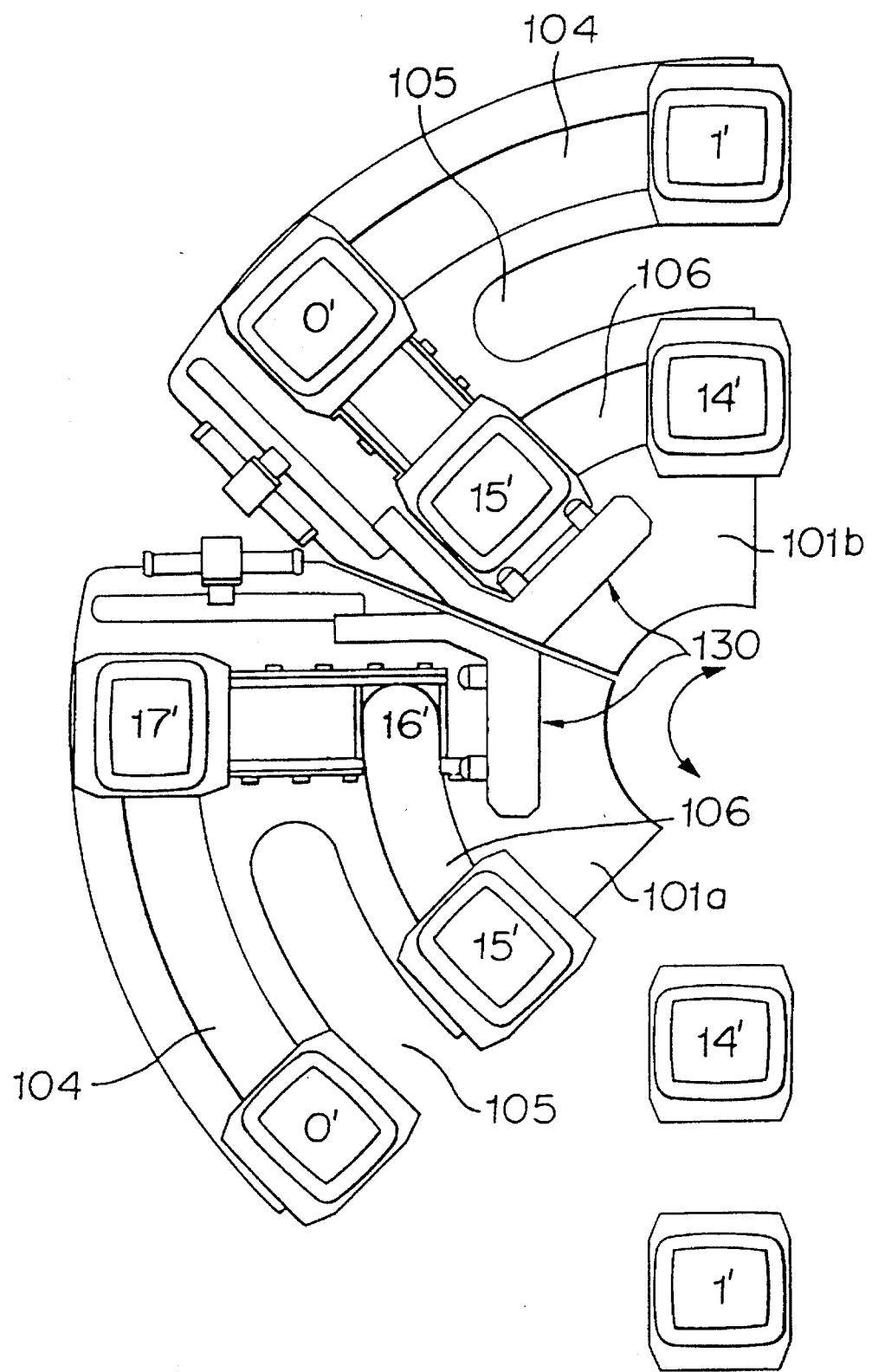
FIG. 31 is an explanatory diagram showing a variational example of a female press-mold distributing device employed in Example 1.

FIG. 31 shows a variational example of the swirl transfer device 31 employed in Example 1.

Although a single swirl table 101 is employed in the above example, in this variation example, individual swirl tables 101a and 101b are provided which are independently driven with respect to the A-side and the B-side, and the female press-molds M which are set at the gob feeding stage ST17' are independently transferred to the pair of press-forming stages ST0'.

According to this type of device, for instance, it is possible to operate only one forming line L1, in case wherein the plunger 210 of the press-forming device 34 of the other molding line L1, is being exchanged, or in case wherein the mold transferring system 30 of the molding line L2 is malfunctioned.

Further, in this variational example, the individual swirl tables 101a and 101b may be integrated by a pertinent fixing means and operated as in Example 1 in accordance with the necessity.

EXAMPLE 2

Figure 32:
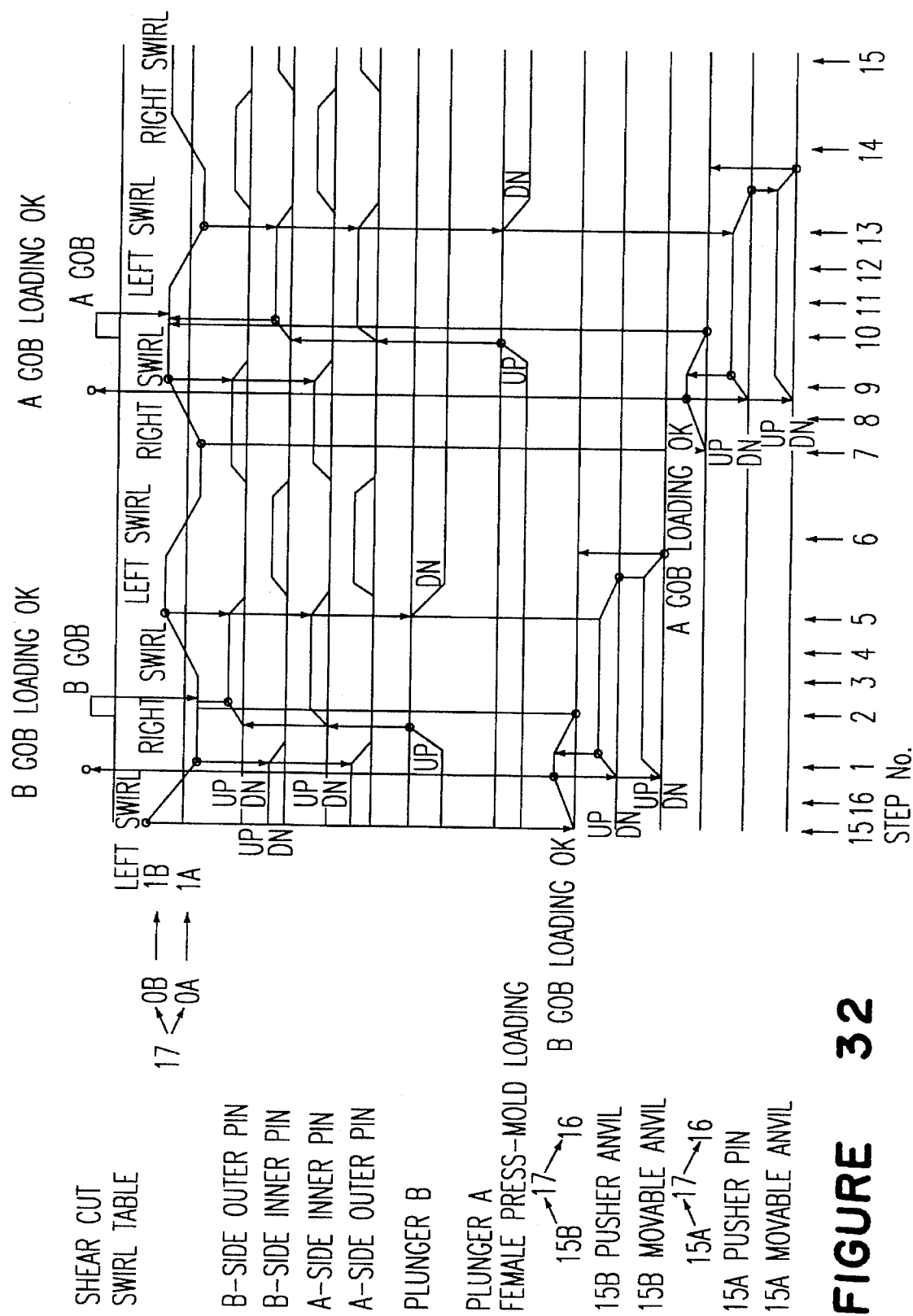
FIG. 32 shows timing charts indicating operational states of a female press-mold distributing device, a female press-mold returning device and a press-forming device in a molding device for a panel of a CRT employed in Example 2.
Figure 33:
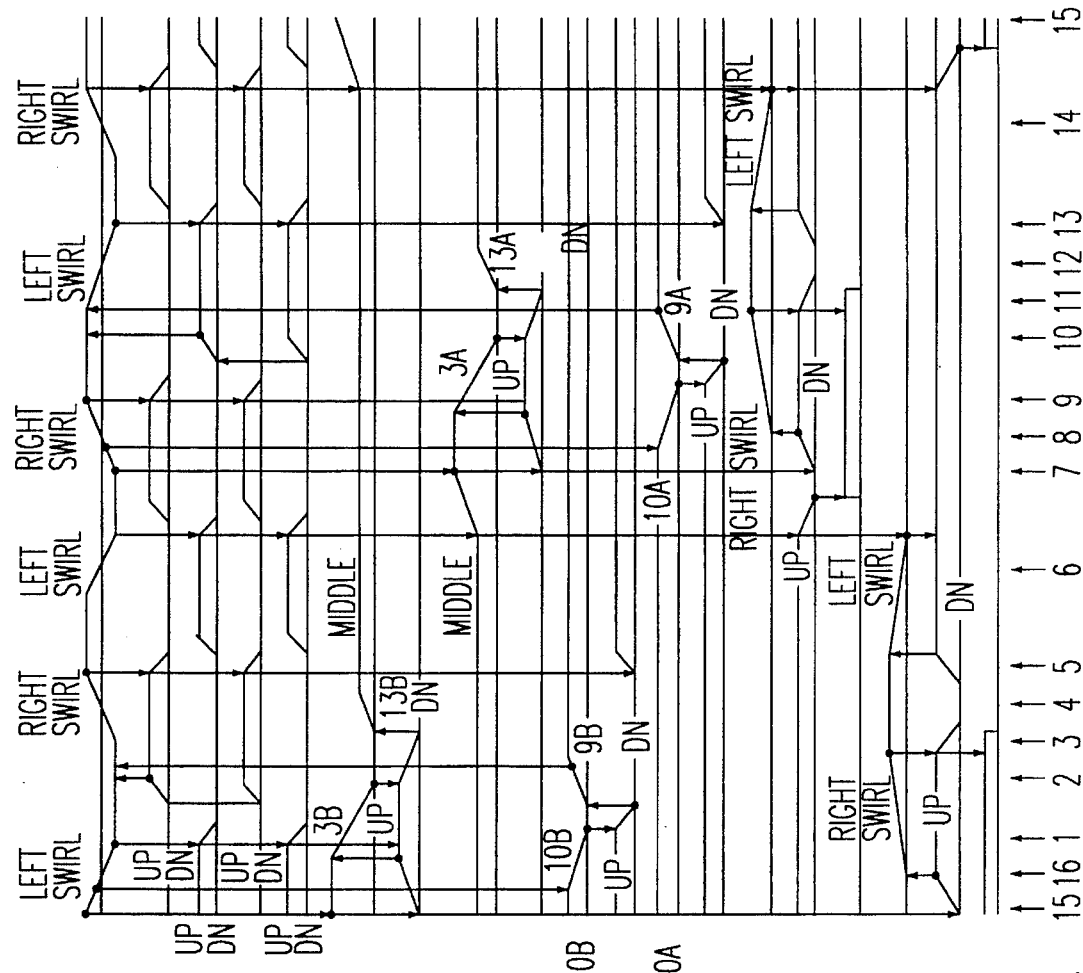
FIG. 33 shows timing charts indicating operational states of linear transfer devices, a cross transfer device and a glass product removing device in a molding device for a panel of a CRT employed in Example 2.
Figure 34:
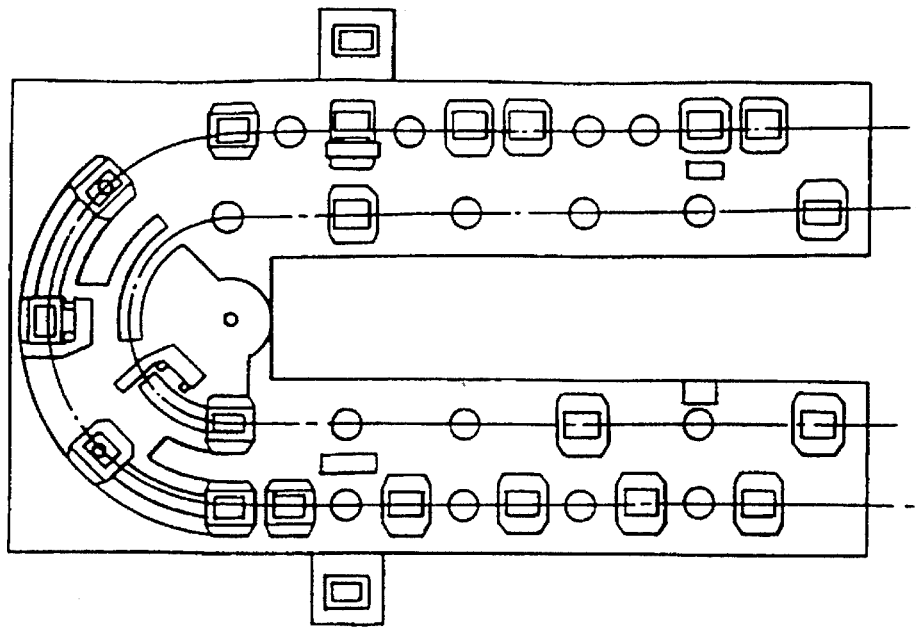
FIG. 34 is a schematic diagram showing the motional step (1) of a molding device for a panel of a CRT in Example 2.
Figure 35:
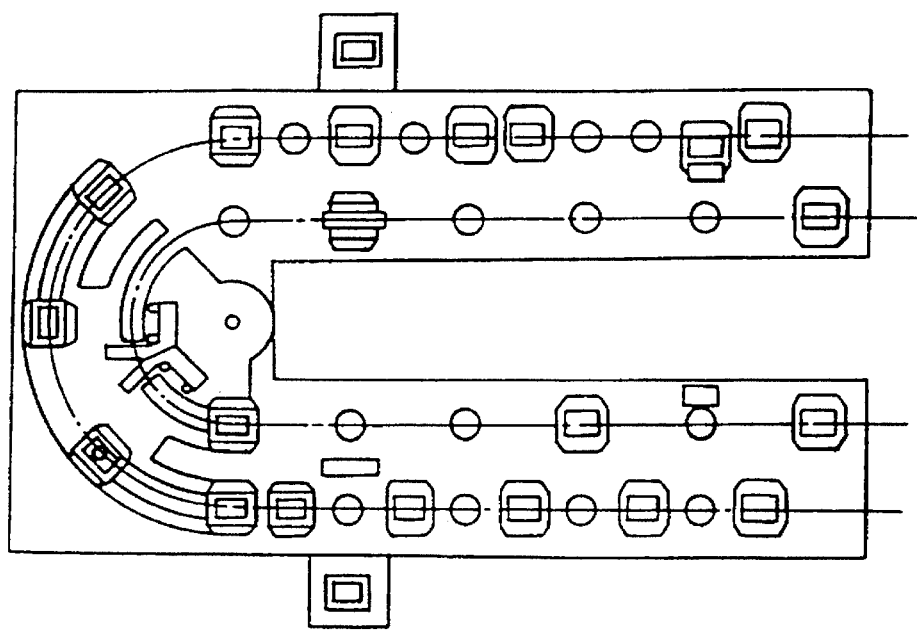
FIG. 35 is a schematic diagram showing the motional step (2) of a molding device for a panel of a CRT in Example 2.
Figure 36:
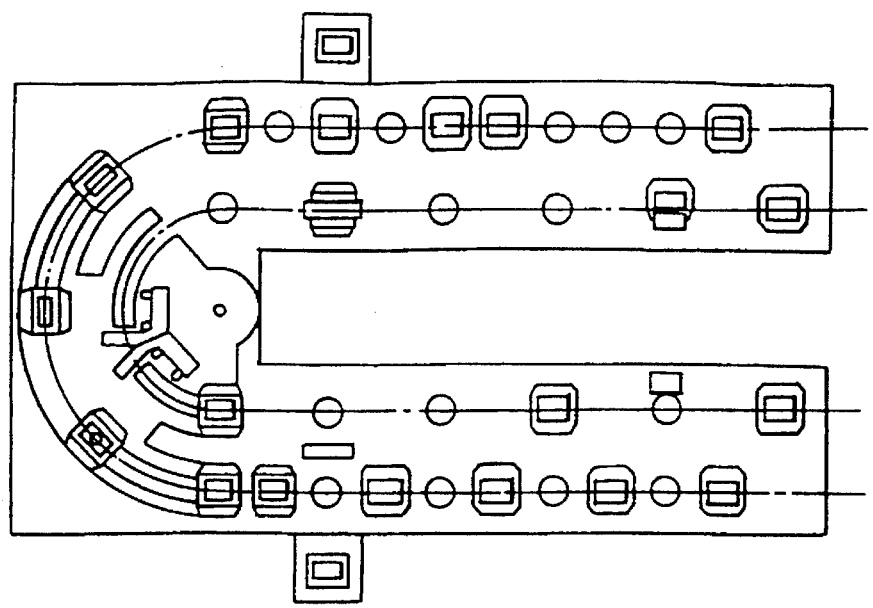
FIG. 36 is a schematic diagram showing the motional step (3) of a molding device for a panel of a CRT in Example 2.
Figure 37:
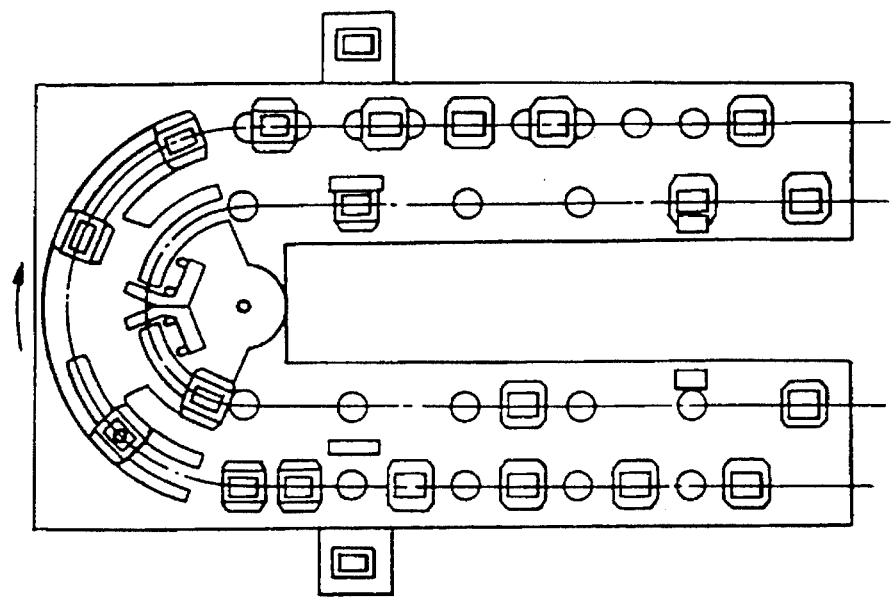
FIG. 37 is a schematic diagram showing the motional step (4) of a molding device for a panel of a CRT in Example 2.
Figure 38:
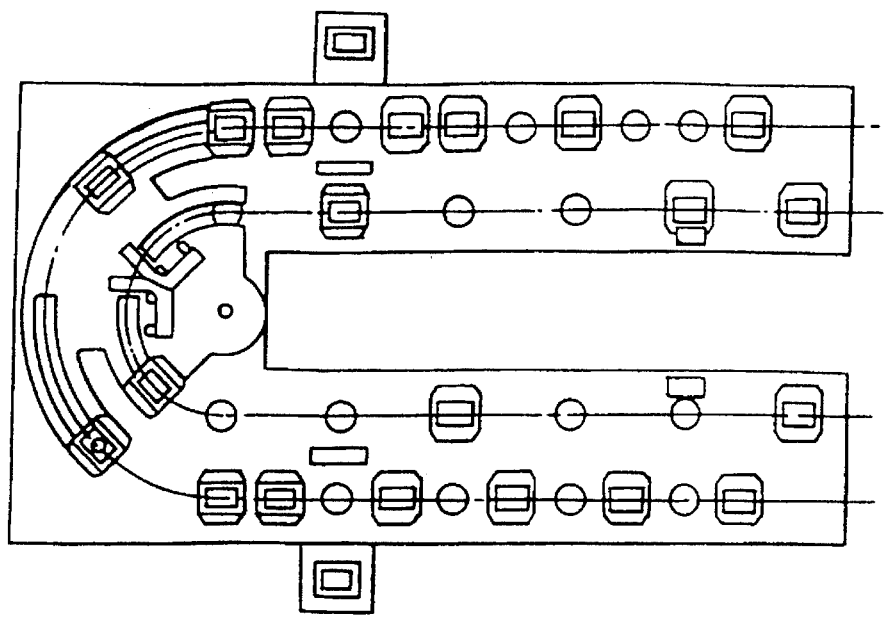
FIG. 38 is a schematic diagram showing the motional step (5) of a molding device for a panel of a CRT in Example 2.
Figure 39:
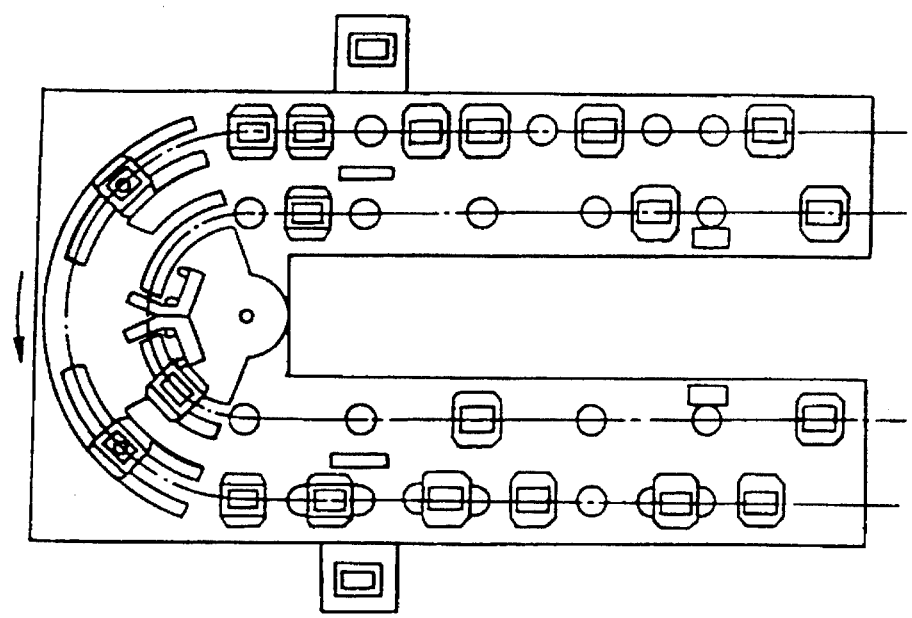
FIG. 39 is a schematic diagram showing the motional step (6) of a molding device for a panel of a CRT in Example 2.
Figure 40:
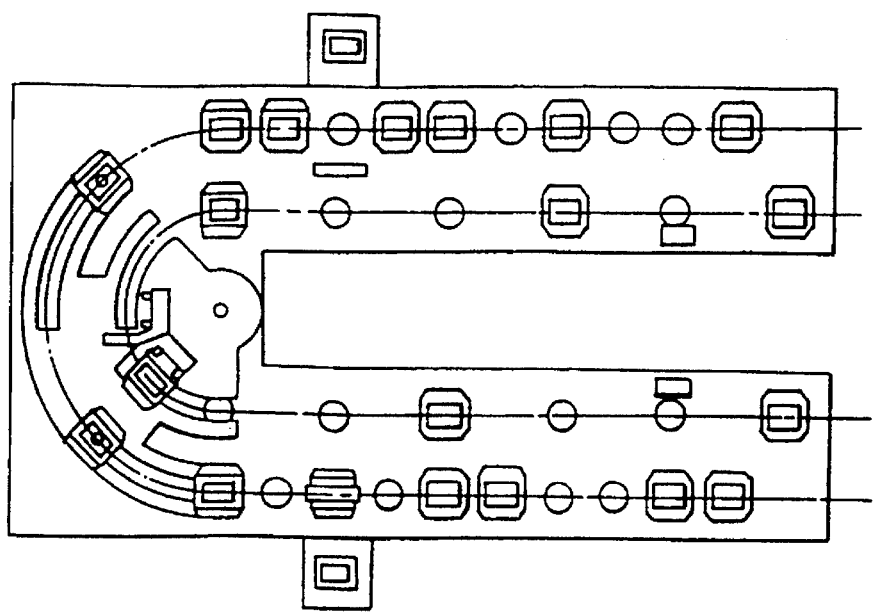
FIG. 40 is a schematic diagram showing the motional step (7) of a molding device for a panel of a CRT in Example 2.
Figure 41:
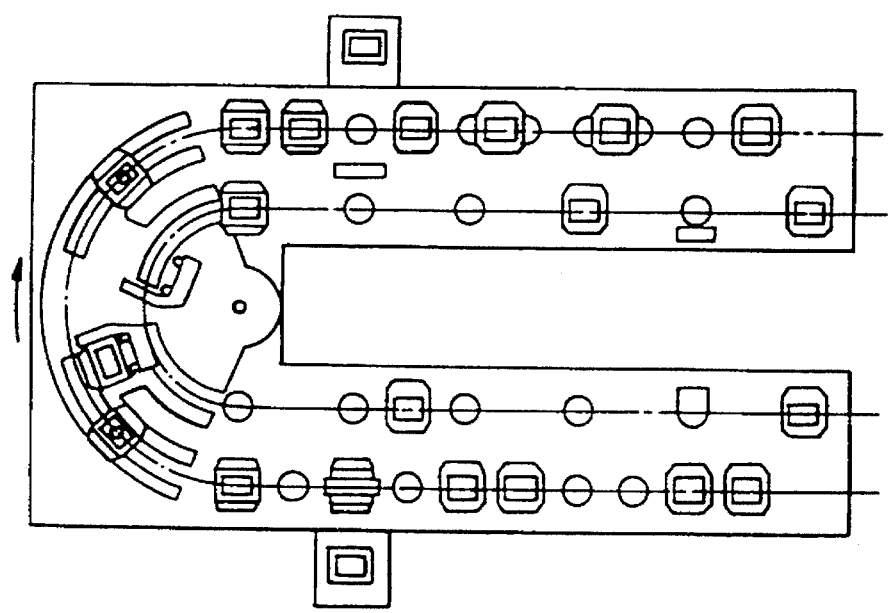
FIG. 41 is a schematic diagram showing the motional step (8) of a molding device for a panel of a CRT in Example 2.
Figure 42:
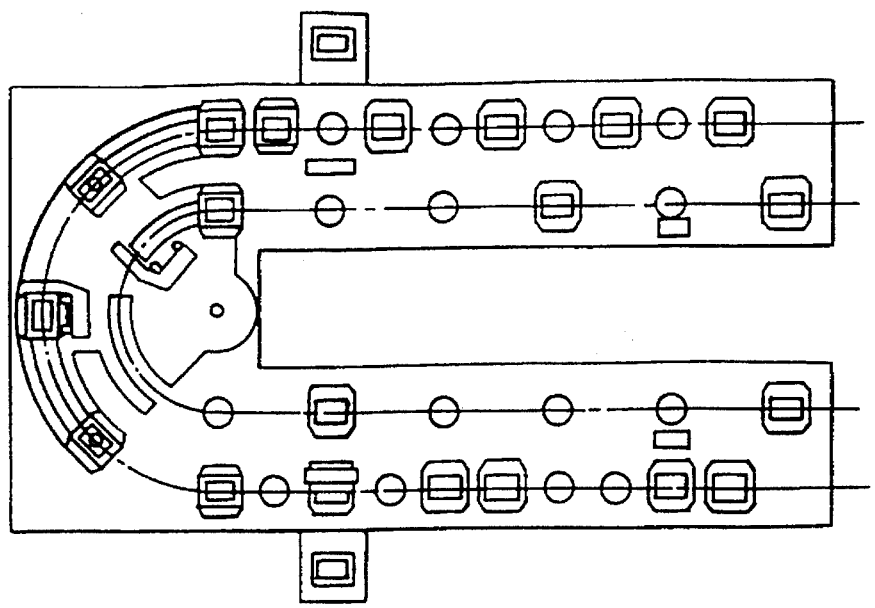
FIG. 42 is a schematic diagram showing the motional step (9) of a molding device for a panel of a CRT in Example 2.
Figure 43:
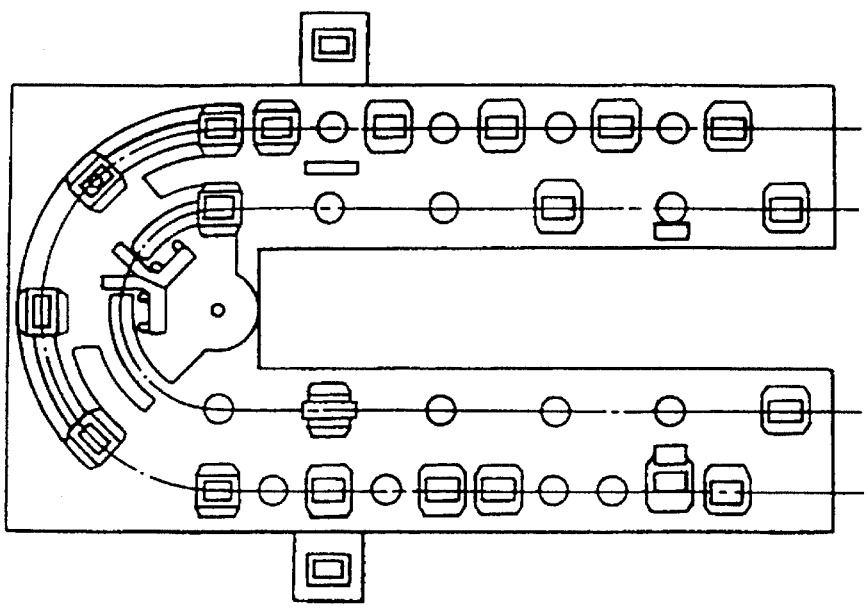
FIG. 43 is a schematic diagram showing the motional step (10) of a molding device for a panel of a CRT in Example 2.
Figure 44:
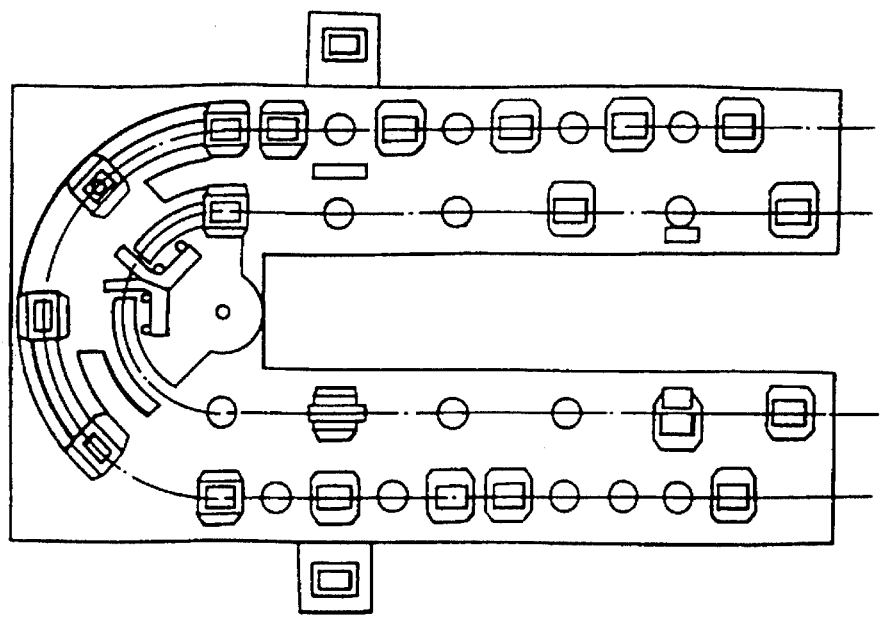
FIG. 44 is a schematic diagram showing the motional step (11) of a molding device for a panel of a CRT in Example 2.
Figure 45:
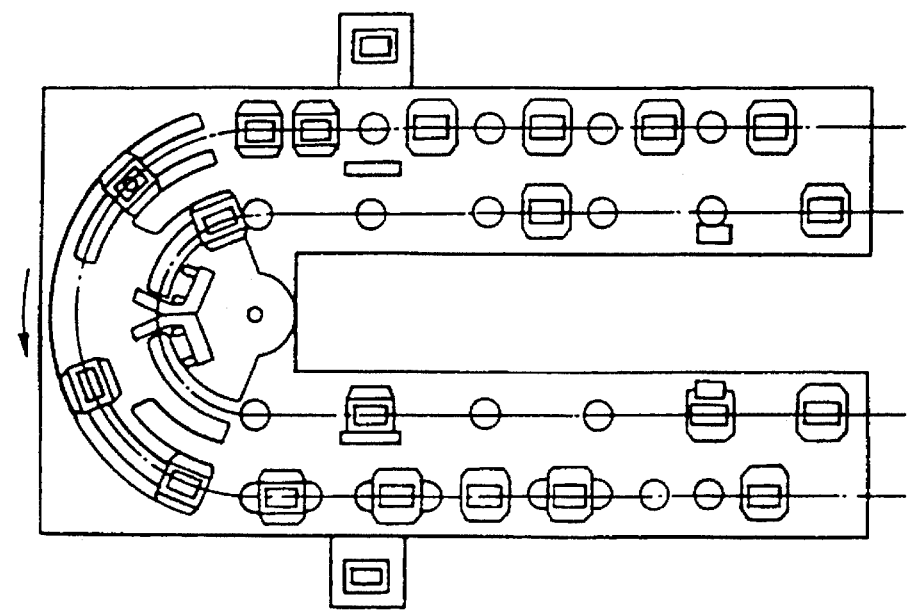
FIG. 45 is a schematic diagram showing the motional step (12) of a molding device for a panel of a CRT in Example 2.
Figure 46:
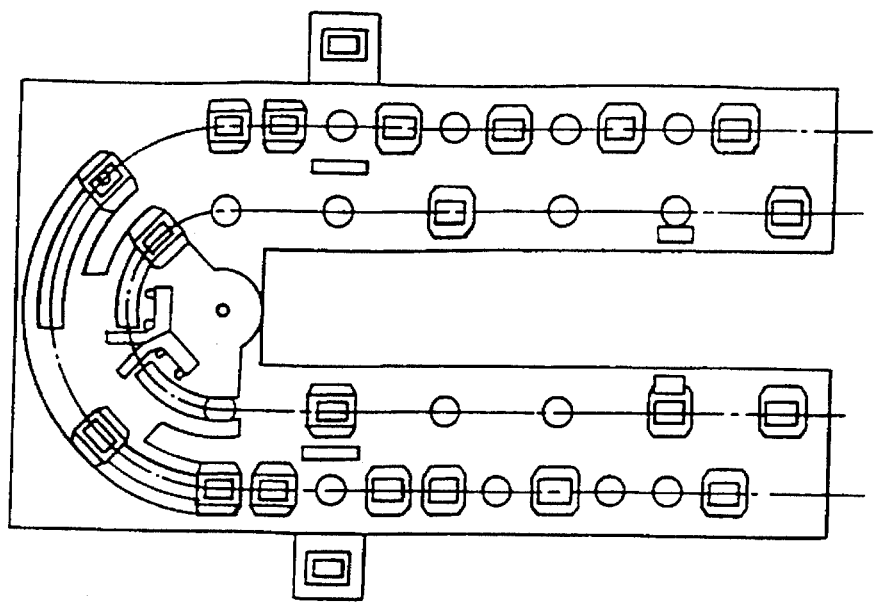
FIG. 46 is a schematic diagram showing the motional step (13) of a molding device for a panel of a CRT in Example 2.
Figure 47:
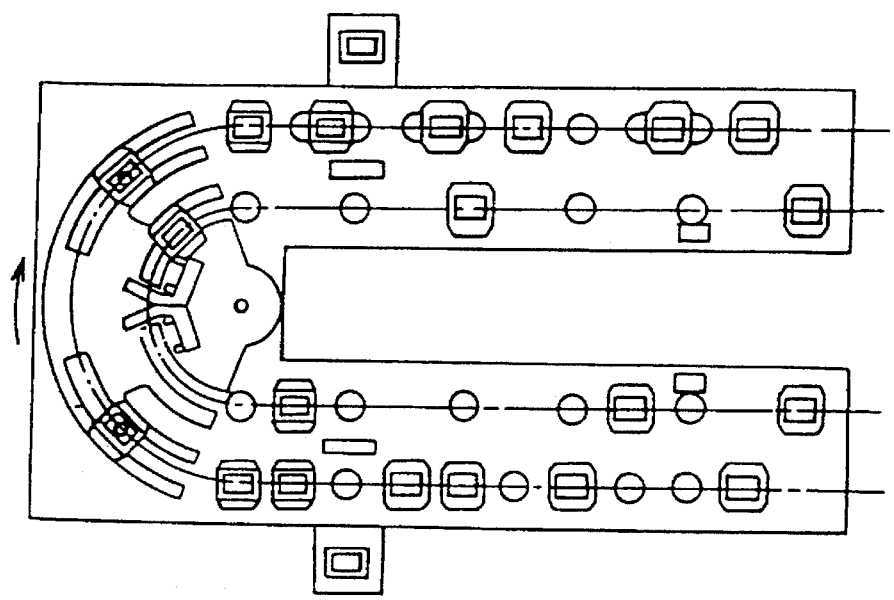
FIG. 47 is a schematic diagram showing the motional step (14) of a molding device for a panel of a CRT in Example 2.
Figure 48:
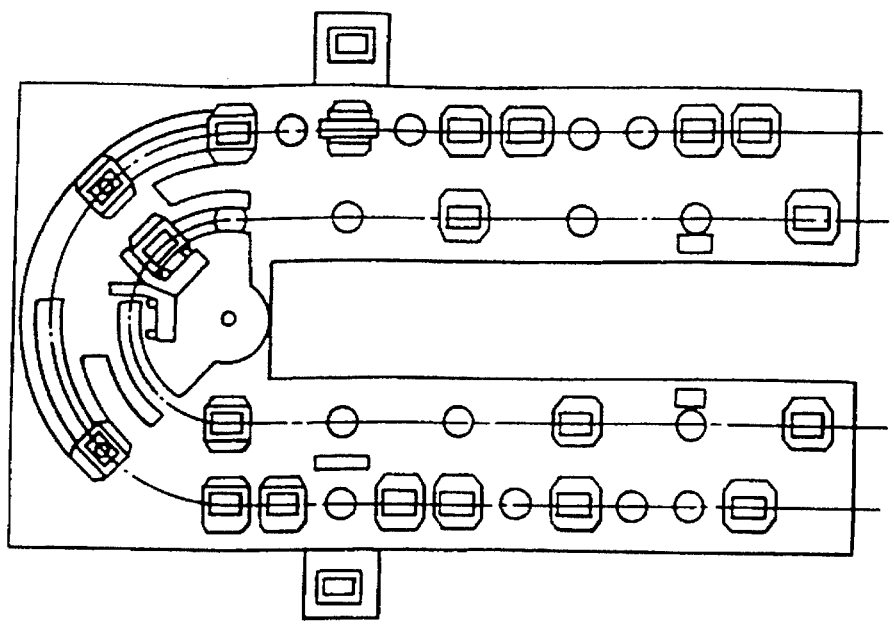
FIG. 48 is a schematic diagram showing the motional step (15) of a molding device for a panel of a CRT in Example 2.
Figure 49:
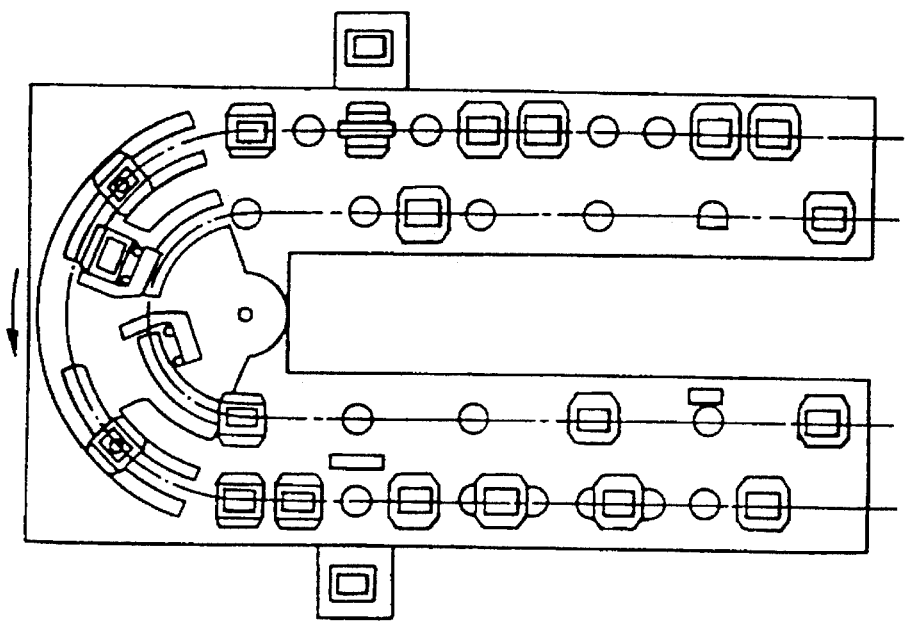
FIG. 49 is a schematic diagram showing the motional step (16) of a molding device for a panel of a CRT in Example 2.
Figure 50:
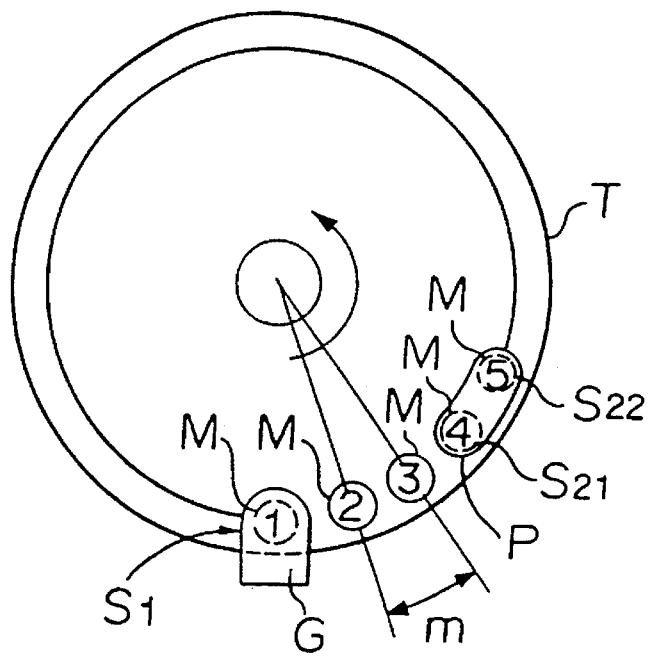
FIG. 50 is an explanatory diagram showing an example of a conventional molding method of a glass product.
Figure 51:
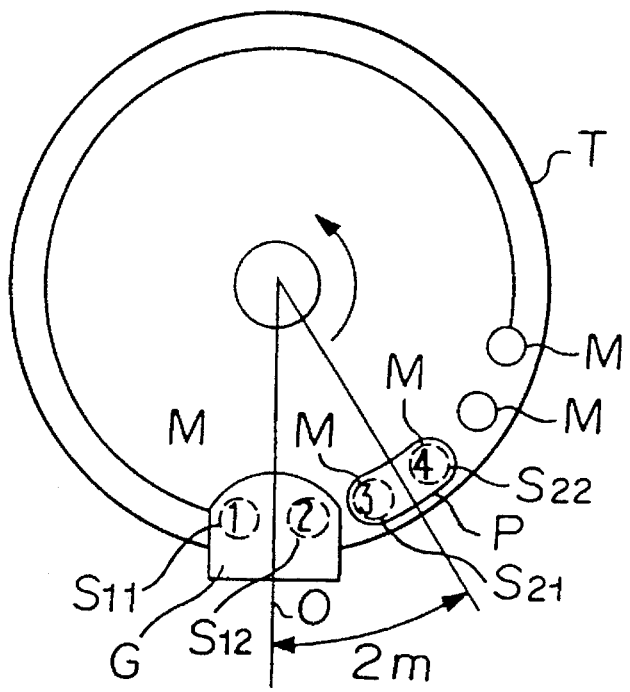
FIG. 51 is an explanatory diagram showing another example of a conventional molding method of a glass product.

The molding device of a panel according to this example is controlled by a controller, not shown, in accordance with the motional timings of FIGS. 32 and 33. In this Example, three times of the right swirl and left swirl of the swirl table makes one cycle of motion, and the motion of one cycle is shown in FIGS. 32 and 33.

In FIG. 32, A gob in the timing chart of shear cut, indicates the timing wherein the gob is fed to the A-side, and B gob, the timing wherein the gob is fed to the B-side.

Further, with respect to the timing chart of the swirl table, rise to the right designates right swirl, and fall to the left, left swirl. In the timing charts of the outer pins 111 and 112 and inner pins 113 on the A-side and B-side, the up-and-down movements are shown by UP and DN. Further, in the timing charts of plungers A and B, the up-and-down movements of the plungers at the press-forming stages ST0 on the A-side and the B-side are shown by UP and DN.

Further, in the chart of the female press-mold loading, the movement locus of the pusher in returning the female press-mold M from the mold returning stages ST15 on the A-side and B-side to the gob feeding stage ST17 is shown, and the movements of the pusher pins and the movable anvils on the A-side and the B-side are shown by the timing charts of 15A pusher pin, a 15A movable anvil, 15B pusher pin and 15B movable anvil, wherein the up-and-down movements are shown by UP and DN.

Further, in FIG. 33, the timing charts of the swirl table, the outer pins and the inner pins on the A-side and the B-side are the same as in FIG. 32. The timing charts of A-side and B-side S/T travelling show the forward and backward movements of the shell mold engaging and removing devices 35 on the A-side and the B-side. The timing charts of A-side and B-side S/T up and down show the up-and-down movements of the positioning pins by UP and DN. Further, the "middle" in the timing chart of the S/T travelling, indicates that the shell mold engaging and removing device 35 stops and waits while the bottom mold is being transferred from the shell mold removing stage ST3' to the shell mold engaging stage ST13'.

Further, the timing charts of cross transfer 9A (9B) to 10A (10B) show the forward and backward movements of the movable shoes of the cross transfer device 303, and the up-and-down movements of the transfer pins on the A-side and the B-side are shown by UP and DN. The timing charts of A (B)-side T/O swirl designate the swirl movements of the swirl motors of the panel removing devices, the timing charts of A (B)-side T/O up and down show the up-and-down movements of the vertical moving cylinder by UP and DN, and the timing charts of A (B)-side T/O vacuum show the vacuum suction and release motions of the vacuum chucks.

FIGS. 34 through 49 schematically show the operational state of device in steps of 1 through 16 in the timing charts of FIGS. 32 and 33. The o mark attached to the press-forming stage ST0' indicates that the press-forming is being performed. According to the schematical diagrams, in two times of swirl movement including the right swirl and the left swirl, the press-forming by the plunger is continuously performed without cooperating with the swirl movement of the swirl table. Further, the number of the female press-molds M is halved wherein the number is reduced compared with that in the case of Example 1 by 8 pieces, and it is understood that the female press-molds M are selectively transferred in one transfer step.

As stated above, according to the invention described in the aspects of the present invention, the following basic effect is achieved.

Firstly, the feeding of gob is performed by a single gob feeding stage as a prerequisite, and the female press-molds fed with the gob are successively distributed to a plurality of press-forming stages, in the step wherein the female press-mold is distributed to a press-forming stage, the press-forming is performed with respect to the gob in the female press-mold which is set in the other press-forming stage. Therefore, it is possible to set the timing for feeding the gob, by only considering the press-forming time in the press-forming stage, without considering the distributing time of the female press-mold, and further, it is possible to maintain constant the time from the timing of feeding the gob to the time of starting the press-forming.

Accordingly, it is possible to promote the molding efficiency of a glass product by accelerating the timing for feeding the gob, while excellently maintaining the uniformity of the basic quality of the glass product.

Secondly, in the mold transferring system which is installed in a line form along an arbitrary transfer locus, the female press-molds fed with the gob are transferred to the respective processing stages beginning with the press-forming stage. Therefore, there is no concern as in the conventional disk-like turn table system, wherein the heat radiation rate from the female press-mold is apt to be nonuniform in the radial direction of the turn table, and wherein the dimensions of a glass product are apt to be deviated in the radial direction of the turn table, and the heat radiation from the female press-mold can be approximately mode uniform at least with respect to the direction of symmetry of the female press-mold.

Accordingly, since the thermal distortion of the female press-mold fed with the gob is approximately equal with respect to the direction of symmetry, for instance, there is no situation wherein a glass product having a symmetrical shape which has been removed from the female press-mold, is provided with an unsymmetrical shape, and the symmetrical shape quality of a glass product can be maintained more uniformly.

Thirdly, in the mold transferring system which is installed in a line form along an arbitrary movement locus, the female press-mold or the bottom mold is transferred along an arbitrary locus (whether it is a curved line or straight line), the positions of the respective processing stages can arbitrarily be determined, and the alternation of the transfer locus of the female press-mold or the bottom mold, or the enlarging of the respective processing stages can be coped with simply by the change of layout such as in a walking beam. Accordingly, there is no considerable restrictions of the layout as in the conventional disk-like turn table system, wherein the respective processing stages are laid out along a circular locus on the turn table, and the number of the female press-molds or the bottom molds which are set on the turn table is uniquely determined by the size of the turn table, and the degrees of freedom in the design of the layout of the molding line of a glass product and the alternation of the layout can considerably be improved.

Particularly, according to a further aspect of the invention, the above specific effect can certainly be achieved in a type of device wherein the female press-mold consists of the bottom mold and the shell mold which is engaged with and removed from the periphery of the bottom mold, and in view of constructing a system having two sets of molding line, also considering attaching and detaching of the shell mold.

Further, according to another aspect of the invention with regard to the female press-mold from one molding line is returned to the gob feeding stage during the distribution operation of the female press-mold from the other molding line to the press-forming stage. Therefore, it is possible to return the female press-mold to the gob feeding stage which should be distributed at the next timing, simultaneously with the distributing movement of the female press-mold. Accordingly, compared with the case wherein the distributing movement and the returning movement of the female press-mold are continuously performed in series, the shortening of the time for distributing the female press-mold and the time for returning the female press-mold can be achieved and the productivity of the molding line of a glass product can be promoted thereby.

Particularly, according to a further aspect of the invention, the pushing guide mechanism is provided on the transfer member of the female press-mold distributing means, as the female press-mold returning means, whereby, during the returning movement of the transfer member of the female press-mold distributing means, the female press-mold on the molding line to which the female press-mold has not been distributed, is returned to the gob feeding stage. Accordingly, the above effect can certainly be provided wherein the interference between the female press-mold distributing means and the female press-mold returning means can be dispensed with.

Further, according to another aspect of the invention, the female press-molds set at the gob feeding stage are alternately swirled to a pair of press-forming stages by the swirl transfer member as the female press-mold distributing means. Accordingly, in case wherein two routes of closed loop molding lines are arranged on both sides of the gob feeding stage, the space for distributing the female press-molds can be saved, and the two routes of closed loop molding lines can efficiently be installed.

Further, according to another aspect of the invention, a female press-mold distributing means is adopted which comprises a pair of transfer members each of which transfers the female press-molds sets at the gob feeding stage to one of the pair of press-forming stages. Accordingly, it is possible to operate only one of the molding lines in case wherein the male press-mold of the press-forming means at the other molding line is exchanged, or in case wherein the mold transferring system of the other molding line is malfunctioned thereby further promoting the molding function in molding a glass product.

According to a further aspect of the invention to firstly, a dummy reciprocating transfer step or steps are provided between the transfer step wherein the female press-mold fed with the gob is transferred to the press-forming stage of one molding line, and the transfer step wherein the female press-mold fed with the gob is transferred to the press-forming stage of the other molding line, with the number of the dummy transfer steps of at least one reciprocating reciprocating stop or steps.

The press-forming is performed without cooperating with the transfer movement in this dummy transfer step or steps, the female press-mold is not transferred to the gob feeding stage or transferred to the press-forming stage from the gob feeding stage, a predetermined number of female press-molds or bottom molds are selectively transferred wherein the number thereof is smaller than the number of the total processing stages which are previously set in the predetermined processing stages beginning with the press-forming stage, and a single cycle is formed by the reciprocating steps of the reciprocating transfer means such as a fan-like swirl table, wherein the number of steps is an odd number not smaller than three. In this way, the time from the gob-feeding to the glass product removing can be controlled to a pertinent time by employing the necessary number of bottom molds and shell molds.

Accordingly, it is possible to mold a glass product having a wide range of gob weight while maintaining excellently the quality of the glass products without performing the alteration in the layout of the molding device.

Secondly, it is possible to mold a glass product while excellently maintaining the quality of the glass matrix in case wherein glass products having different gob weights are molded, since the feeding amount of the glass matrix from the melting furnace of glass can be maintained constant by adopting the above construction.

Thirdly, the range of selecting of time wherein the female press-molds or the bottom molds are stopped at the respective processing stage, is widened, while the gob feeding interval is determined such that the feeding amount of glass matrix is maintained constant. Accordingly, a heat cycle can be determined wherein the temperature of the glass product or the mold is suitable for molding. On the other hand, the time chart for transferring the bottom mold and the shell mold at timing can be determined, whereby such a heat cycle can be formed. Accordingly, it is possible to mold a glass product while excellently maintained the quality in the appearance of the glass product and in the dimensional accuracy.

Further, the degree of freedom in setting the time chart for transferring is enhanced, and the two routes of closed loop molding line are installed with respect to a single gob feeding stage. Accordingly, it is possible to further promote the molding function of a glass product wherein glass product having different gob weights can simultaneously be molded at the respective molding lines.

We claim:

1. A device for forming a glass product, the device comprising:

female press-molds and a mold transferring system for transferring the female press-molds to a plurality of processing stages, said plurality of processing stages comprising a gob feeding stage, a plurality of press-forming stages, and a plurality of glass product removing stages, wherein the mold transferring system transfers the female press-molds to each of said plurality of processing stages;

a gob feeding means for successively feeding the female press-molds transferred to the gob feeding stage with a gob at predetermined intervals;

a press-forming means for press-forming the gob in each of the female press-molds, wherein the female press-mold fed with the gob is transferred to one of the press-forming stages;

a glass product removing means for removing a glass product from the female press-molds at one of the glass product removing stages; and a plurality of closed loop molding lines, wherein said mold transferring system is provided along said plurality of closed loop molding lines and said plurality of press-forming stages are provided to surround the gob feeding stage and which include said plurality of glass product removing stages corresponding to the plurality of the press-forming stages;

said mold transferring system comprising:

a female press-mold distributing means for successively distributing the female press-molds fed with the gob in the gob feeding stage to the plurality of press-forming stages;

a female press-mold returning means for successively returning the female press-molds to the gob feeding stage from the plurality of closed loop molding lines in cooperation with the female press-mold distributing means;

a plurality of mold transferring means for transferring the female press-molds from the plurality of press-forming stages and each of said processing stages through the plurality of closed loop molding lines; and a mold transfer controlling means for controlling the plurality of mold transferring means in cooperation with a distribution of the female press-molds by the female press-mold distributing means, whereby at least a transferring of the female press-molds from the press-forming stage by one of the mold transferring means on one of the closed loop molding lines to which the female press-molds have been previously distributed at a is stopped and the press-forming by the press-forming means is performed;

wherein the female press-mold returning means is attached to the female press-mold distributing means such that the female press-mold returning means moves in a direction different from a moving direction of the female press-mold distributing means whereby a first one of the female press-molds returns to the gob feeding stage from a first one of the closed loop molding lines when a second one of the female press-molds from a second one of the closed loop molding lines is being distributed to the press-forming stage.

2. A device for forming a glass product, the device comprising:

female press-molds and a mold transferring system for transferring step by step the female press-molds each comprising a bottom mold and a shell mold engaged with a periphery of the bottom mold to a plurality of processing stages, said plurality of processing stages comprising a gob feeding stage, a press-forming stage, a shell mold removing stage, a glass product removing stage, and a shell mold engaging stage, wherein the mold transferring system transfers the female press molds to each of said plurality of processing stages;

a gob feeding means for successively feeding a gob to the female press-molds transferred to the gob feeding stage at predetermined intervals;

a press-forming means for press-forming the gob in each of the female press-molds into a glass product at the press-forming stage;

a shell mold removing means for removing the shell mold from the female press-molds at the shell mold removing stage;

a glass product removing means for removing the glass product from the bottom mold at the glass product removing stage;

a shell mold engaging means for engaging the shell mold to the bottom mold from which the glass product has been removed at the shell mold engaging stage before returning the female press-molds to the gob feeding stage; and a pair of closed loop molding lines, wherein said mold transferring system is provided along the pair of closed loop molding lines provided with a pair of the press-forming stages interposing the gob feeding stage and each of which is provided with the shell mold removing stage, the glass product removing stage and the shell mold engaging stage; and wherein said mold transferring system further comprises:

a female press-mold distributing means for alternately distributing the female press-molds fed with the gob in the gob feeding stage to the pair of the press-forming stages;

a female press-mold returning means for returning the female press-molds each comprising the bottom mold and the shell mold engaged with a periphery of the bottom mold at the shell mold engaging stage to the gob feeding stage alternately from the respective closed loop molding lines cooperating with the female press-mold distributing means;

a first mold transferring means for transferring the female press-molds set in the press-forming stage and at the remaining processing stages in a first closed loop molding line;

a second mold transferring means for transferring the female press-molds set in the press-forming stage and at the remaining processing stages in a second closed loop molding line; and a mold transfer controlling means for controlling the first and the second mold transferring means in cooperation with a distribution of the female press-molds by the female press-mold distributing means, whereby at least a transferring of the female press-molds from the press-forming stage of the first or the second mold transferring means on one of the closed loop molding lines to which the female press molds have not previously been distributed is stopped and the press-forming by the press-forming means is performed;

wherein the female press-mold distributing means comprises a swirling transfer member which swirls in an angular range between the gob feeding stage and the press-forming stage for transferring the female press-molds set at the gob feeding stage to the press-forming stage.

3. A method for forming a glass product, the method comprising the steps of:

successively setting female press-molds on a gob feeding stage;

feeding a gob to the female press-molds at the gob feeding stage at predetermined intervals;

successively transferring the female press-molds fed with the gob to a press-forming stage;

press-forming the gob into a glass product at the press-forming stage; and removing the press-formed glass product at a glass product removing stage;

wherein a pair of the press-forming stages are provided surrounding the gob feeding stage;

wherein a pair of closed loop molding lines are provided each of which independently performs a series of steps including the steps of press-forming the gob and removing the press-formed glass product;

wherein a female press-mold returning means is provided for alternately returning empty female press-molds to the gob feeding stage from the pair of closed loop molding lines;

wherein a dummy transferring step is provided between the step of transferring the female press-mold fed with the gob to the press-forming stage of a first one of the closed loop molding lines and the step of transferring the female press-mold fed with the gob to the press-forming stage of a second one of the closed loop molding lines;

wherein in said dummy transferring step, a female press-mold distributing means is reciprocated in one of said closed loop molding lines by n, which is an integer not less than 1, times without transferring the empty female press-molds, the press-forming step is performed and the female press-molds whose number is smaller than a total number of processing stages of at least the press-forming stage by at least two are selectively transferred; and said female press-mold distributing means forms a single cycle by a number of the steps of reciprocating the female press-mold distributing means, said number being an odd number not less than three.

4. A device for forming a glass product, the device comprising:

(1) female press-molds and a gob feeding means for successively feeding the female press-molds which have been transferred to a gob feeding stage with a gob at predetermined intervals;

(2) a plurality of closed loop molding lines each further comprising:
  (a) a press-forming means for press-forming the gob in the female press-molds wherein the female press-molds fed with the gob are transferred to a press-forming stage, a plurality of said press-forming stages surrounding the gob feeding stage;
  (b) a glass product removing means for removing a glass product from the female press-molds at a glass product removing stage; and
  (c) a mold transferring system for transferring the female press-molds to each of the gob feeding stage, press-forming stage and glass product removing stage;

said mold transferring system being provided along the plurality of closed loop molding lines wherein said plurality of the press-forming stages are provided to surround the gob feeding stage and which include a plurality of the glass product removing stages corresponding to the plurality of the press-forming stages;

said mold transferring system comprising:

a female press-mold distributing means for successively distributing the female press-molds fed with the gob in the gob feeding stage to the plurality of press-forming stages;

a female press-mold returning means for successively returning the female press-molds to the gob feeding stage from the plurality of closed loop molding lines in cooperation with the female press-mold distributing means;

a plurality of mold transferring means for transferring the female press-molds positioned in at least the plurality of the press-forming stages in the plurality of closed loop molding lines; and a mold transfer controlling means for controlling the plurality of mold transferring means in cooperation with the distribution of the female press-molds by the female press-mold distributing means, whereby at least a transferring of one of the female press-molds from the press-forming stage by one of the mold transferring means of one of the closed loop molding lines to which the female press-molds have been distributed at a preceding step of distributing the female press-molds is stopped and the press-forming by the press-forming means is performed;

wherein the female press-mold returning means is attached to the female press-mold distributing means such that the female press-mold returning means moves in a direction different from a moving direction of the female press-mold distributing means whereby a first one of the female press-molds returns to the gob feeding stage from a first one of the closed loop molding lines when a second one of the female press-molds from a second one of the closed loop molding lines is being distributed to the press-forming stage.

5. A device for forming a glass product, the device comprising:

(1) female press-molds each comprising a shell mold and a bottom mold and a gob feeding means for successively feeding a gob to the female press-molds transferred to a gob feeding stage at predetermined intervals; and (2) a pair of closed loop molding lines comprising:
  (a) a press-forming means for press-forming the gob in the female press-molds into a glass product wherein the female press-molds fed with the gob is transferred to a press-forming stage, a pair of said press-forming stages surrounding the gob feeding stage;
  (b) a shell mold removing means for removing the shell mold from the female press-molds at a shell mold removing stage;
  (c) a glass product removing means for removing a glass product from the bottom mold at a glass product removing stage;
  (d) a shell mold engaging means for engaging the shell mold to a periphery of the bottom mold from which the glass product has been removed at a shell mold engaging stage before returning the female press-molds to the gob feeding stage; and
  (e) a mold transferring system for transferring step by step the female press-molds each comprising the bottom mold and the shell mold engaged with a periphery of the bottom mold to each of the gob feeding stage, press-forming stage, shell mold removing stage, glass product removing stage and shell mold engaging stage which are provided along the pair of closed loop molding lines;

wherein said mold transferring system further comprises:

a female press-mold distributing means for alternately distributing the female press-molds fed with the gob in the gob feeding stage to the pair of the press-forming stages;

a female press-mold returning means for returning the female press-molds each comprising the bottom mold and the shell mold engaged with a periphery of the bottom mold at the shell mold engaging stage to the gob feeding stage alternately from the pair of closed loop molding lines cooperating with the female press-mold distributing means;

a first mold transferring means for transferring one of the female press-molds set in the press-forming stage to the shell mold removing stage, glass product removing stage and shell mold engaging stage in a first closed loop molding line;

a second mold transferring means for transferring one of the female press-molds set in the press-forming stage to the shell mold removing stage, glass product removing stage and shell mold engaging stage in a second closed loop molding line; and a mold transfer controlling means for controlling the first and the second mold transferring means cooperating with the distribution of the female press-molds by the female press-mold distributing means, whereby at least a transferring of the female press-molds from the press-forming stage of the first or the second mold transferring means of one of the closed loop molding lines to which the female press-molds have not been distributed during the distribution of the female press-molds is stopped and the press-forming by the press-forming means is performed;

wherein the female press-mold distributing means comprises a swirling transfer member which swirls in an angular range between the gob feeding stage and the press-forming stage for transferring the female press-molds set at the gob feeding stage to the press-forming stage.

6. A device for forming a glass product, the device comprising:

female press-molds and a mold transferring system for transferring step by step the female press-molds each comprising a bottom mold and a shell mold engaged with a periphery of the bottom mold to a plurality of processing stages, the plurality of processing stages comprising a gob feeding stage, a press-forming stage, a shell mold removing stage, a glass product removing stage, and a shell mold engaging stage, wherein the mold transferring system transfers the female press-molds to each of said processing stages;

a gob feeding means for successively feeding a gob to the female press-molds transferred to the gob feeding stage at predetermined intervals;

a press-forming means for press-forming the gob in the female press-molds into a glass product wherein the female press-molds fed with the gob is transferred to the press-forming stage;

a shell mold removing means for removing the shell mold from the female press-molds at the shell mold removing stage;

a glass product removing means for removing the glass product from the bottom mold at the glass product removing stage;

a shell mold engaging means for engaging the shell mold to the bottom mold from which the glass product has been removed at the shell mold engaging stage before returning the female press-molds to the gob feeding stage;

wherein said mold transferring system is provided along a pair of closed loop molding lines provided with a pair of the press-forming stages interposing the gob feeding stage and each of which is provided with the shell mold removing stage, the glass product removing stage and the shell mold engaging stage; and wherein said mold transferring system further comprises:

a female press-mold distributing means for alternately distributing the female press-molds fed with the gob in the gob feeding stage to the pair of the press-forming stages;

a female press-mold returning means for returning the female press-molds each comprising the bottom mold and the shell mold engaged with a periphery of the bottom mold at the shell mold engaging stage to the gob feeding stage alternately from the respective one of the pair of closed loop molding lines cooperating with the female press-mold distributing means, said female press-mold returning means comprising a transferring member a first mold transferring means for transferring at least one of the female press-molds set in the press-forming stage to the shell mold removing stage, glass product removing stage and shell mold engaging stage in a first of said pair of closed loop molding lines;

a second mold transferring means for transferring at least one of the female press-molds set in the press-forming stage to the shell mold removing stage, glass product removing stage and shell mold engaging stage in a second of said pair of closed loop molding lines; and a mold transfer controlling means for controlling the first and the second mold transferring means cooperating with the distribution of the female press-molds by the female press-mold distributing means, whereby at least a transferring of the female press-molds from the press-forming stage of the first or the second mold transferring means of one of the closed loop molding lines to which the female press-molds have not been distributed in the step of distributing the female press-molds is stopped and the press-forming by the press-forming means is performed;

wherein the female press-mold returning means comprises a pushing guide mechanism installed on said transferring member of the female press-mold distributing means for returning the female press-molds received from one of the first and second mold transferring means of one of the closed loop molding lines to which the female press-molds have not been distributed, when the transferring member returns to an initial position at the gob feeding stage.

* * * * *